US012793491B2

(12) United States Patent
Soundararajan et al.

(10) Patent No.: US 12,793,491 B2
(45) Date of Patent: Nov. 10, 2026

(54) SEATING ASSIGNMENT AND OPTIMIZATION

(71) Applicant: Zoho Corporation Private Limited, Chengalpattu Taluk (IN)

(72) Inventors: Manikanda Vignesh Soundararajan, Salem (IN); Sridhar Pazhayannur Gopalakrishnan, Kancheepuram (IN); Vijaykumar Rajendran, Chennai (IN); Anjana Venkatachalam, Chennai (IN); Punithavathi Palani, Chennai (IN); Sudheer A. Grandhi, Pleasanton, CA (US)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

(21) Appl. No.: 18/799,867

(22) Filed: Aug. 9, 2024

(65) Prior Publication Data

US 2024/0404340 A1 Dec. 5, 2024

Related U.S. Application Data

(63) Continuation of application No. 18/240,097, filed on Aug. 30, 2023, now Pat. No. 12,067,823, which is a continuation of application No. 17/163,322, filed on Jan. 29, 2021, now Pat. No. 11,756,358.

(60) Provisional application No. 63/083,037, filed on Sep. 24, 2020.

(30) Foreign Application Priority Data

Jan. 31, 2020 (IN) ............................. 202041004421
Jul. 14, 2020 (IN) ............................. 202041029863
Jan. 15, 2021 (IN) ............................. 202141001887

(51) Int. Cl.
*G07C 9/22* (2020.01)
*G06F 21/62* (2013.01)
*G06Q 10/02* (2012.01)
*G07C 9/27* (2020.01)

(52) U.S. Cl.
CPC ........... *G07C 9/22* (2020.01); *G06F 21/6254* (2013.01); *G06Q 10/02* (2013.01); *G07C 9/27* (2020.01)

(58) Field of Classification Search
None
See application file for complete search history.

(56) References Cited

U.S. PATENT DOCUMENTS 8,452,683 B2 * 5/2013 Bayne .................... G06Q 20/08 705/36 R
11,036,374 B2 6/2021 Sica
2013/0144665 A1 6/2013 Denker
(Continued)

*Primary Examiner* — Carlos Garcia
(74) *Attorney, Agent, or Firm* — Ahmann Kloke LLP

(57) ABSTRACT

The proposed seating assignment and optimization systems and methods aim at creating a hassle free event seating assignment to suit event attendees. When attendees registered as a group arrive at different times, they have an option to check-in individually and be seated with their group. While seating assigned at registration may be on a preliminary basis, further seating assignment optimization is carried out at the time of check-in based on the arrival of attendees at the event location. The system and methods enable communication between meeting attendees including individuals and group participants.

12 Claims, 20 Drawing Sheets

(56) References Cited

U.S. PATENT DOCUMENTS

| | | | |
|---|---|---|---|
| 2014/0316828 | A1 | 10/2014 | Lin |
| 2017/0024666 | A1 | 1/2017 | Oxenham |
| 2017/0178190 | A1 | 6/2017 | Wu |
| 2019/0005982 | A1 | 1/2019 | Hazan |
| 2020/0265343 | A1 | 8/2020 | Plant |
| 2020/0265494 | A1 | 8/2020 | Glaser |
| 2020/0363933 | A1 | 11/2020 | Sica |
| 2021/0263640 | A1 | 8/2021 | Sica |

* cited by examiner

SEATING ASSIGNMENT AND OPTIMIZATION

CROSS-REFERENCE TO RELATED APPLICATIONS

The present application is a continuation of U.S. patent application Ser. No. 18/240,097 filed Aug. 30, 2023, now U.S. Pat. No. 12,067,823, which is a continuation of U.S. patent application Ser. No. 17/163,322 filed Jan. 29, 2021, now U.S. Pat. No. 11,756,358, which claims priority to Indian Provisional Patent Application No. 202041004421 filed Jan. 31, 2020, Indian Provisional Patent Application No. 202041029863 filed Jul. 14, 2020, Indian Provisional Patent Application No. 202141001887 filed Jan. 15, 2021, and U.S. Provisional Patent Application Ser. No. 63/083,037 filed Sep. 24, 2020, which are hereby incorporated by reference herein.

BACKGROUND

Organizing real-world events requires resources and coordination that involve geographical locations (venues), physical objects (e.g., badges), and data management associated with administrators, organizers, content providers (e.g., presenters), printers, visitors, and other parties involved in event preparation and participation. Ways to reduce resource consumption and improve coordination of both real-world and virtual assets is an area of ongoing research and development.

SUMMARY

An effective strategy should result in reduced resource consumption in association with an event. Reducing time at a bottleneck in event check-in would be considered a positive result. However, it is desirable to maintain privacy policy compliance. Utilizing the techniques described in this paper reduces time at check-in related to physical badge preparation and distribution while maintaining privacy policy compliance. A system and method can include pre-event activities, event-concurrent activities, and post-event activities related to accuracy, precision, aesthetics, coordination, and learning in association with badge preparation and distribution.

BRIEF DESCRIPTION OF THE DRAWINGS

FIG. 14 depicts a flowchart of an example of a method for generating a code tagged with a ticket ID and an optional group ID used for individual and group check-in.

FIG. 15 depicts a flowchart of an example of a method to implement group check-in.

FIG. 16A and FIG. 16B depict a conceptual diagram of an example of a priority check-in.

DETAILED DESCRIPTION

Figure 1:
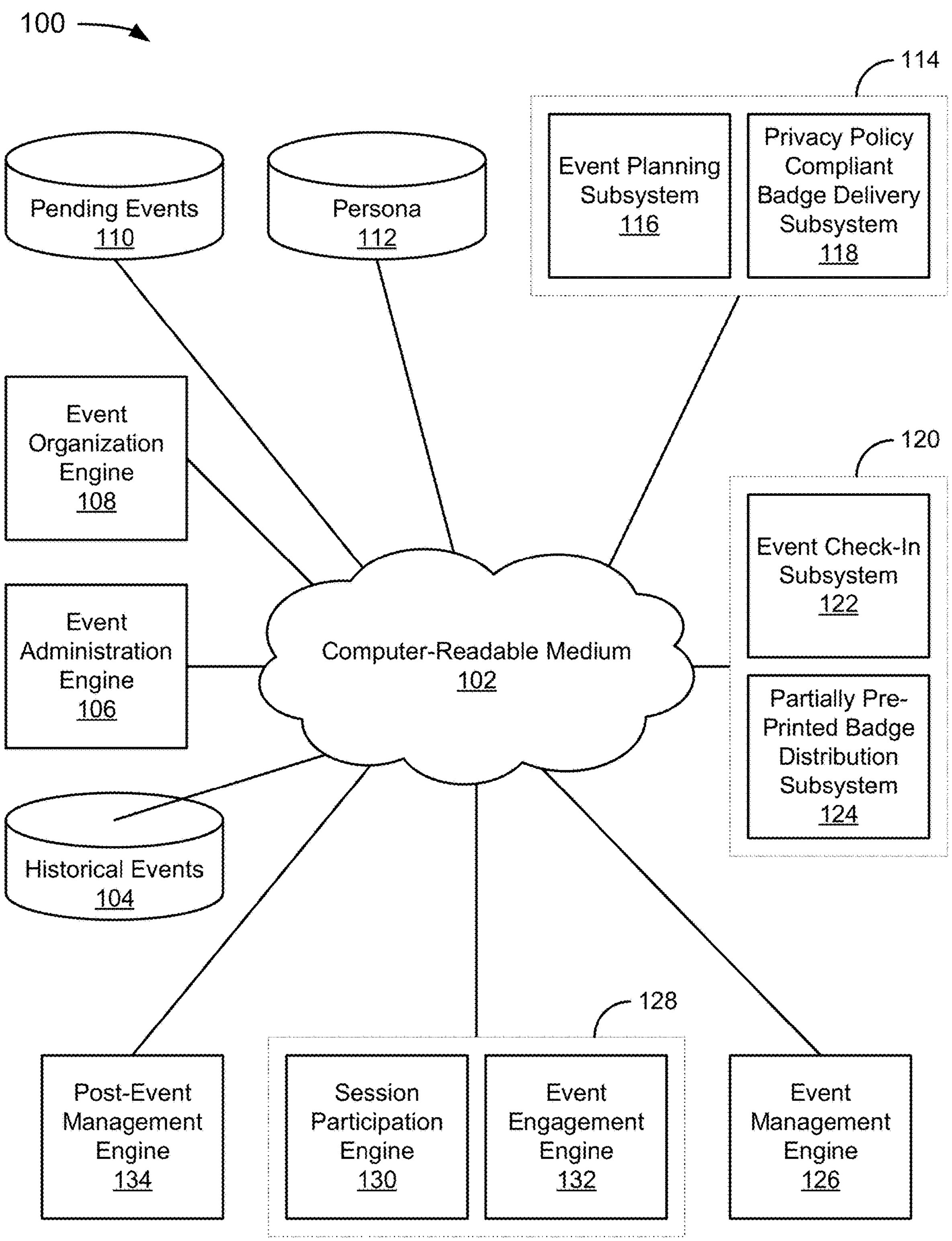
FIG. 1 depicts a diagram of an example of a system for event planning and management with persona-agnostic and persona-specific badges for participants.

FIG. 1 depicts a diagram 100 of an example of a system for event planning and management with persona-agnostic and persona-specific badges for participants. The diagram 100 includes a computer-readable medium (CRM) 102, a historical events datastore 104 coupled to the CRM 102, an event administration engine 106 coupled to the CRM 102, an event organization engine 108 coupled to the CRM 102, a pending events datastore 110 coupled to the CRM 102, a persona datastore 112 coupled to the CRM 102, a pre-event management engine 114 coupled to the CRM 102, an attendee reception engine 120 coupled to the CRM 102, an event management engine 126 coupled to the CRM 102, an event feedback prompting engine 128 coupled to the CRM 102, and a post-event management engine 134 coupled to the CRM 102.

The CRM 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is co-located on one device and a second component is located on a different device, the CRM 102 can include a wireless or wired back-end network or LAN. The CRM 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the historical events datastore 104 is intended to represent data structures associated with events. Where a distinction is desired between an event at a physical geography and an event that occurs online, the former can be referred to as a real-world (or physical) event and the latter can be referred to as a virtual event. As will become apparent below, the events are intended to include real-world events, but it should be understood that agents of an entity that are responsible for event administration, organization, and/or management can be responsible for both physical and virtual events. Accordingly, though much of the discussion in this paper is regarding real-world events, it should be understood that the techniques herein may be applicable to virtual events and the historical data associated with a virtual event may be used in association with a physical event, and vice versa.

The historical events datastore 104 and other datastores described in this paper can have a corresponding engine to create, read, update, or delete (CRUD) data structures. While not shown in FIG. 1, these engines may or may not be described in association with other figures to illustrate relevant functionality.

The event administration engine 106 is intended to represent an engine by which an event administrator can initialize an event data structure or otherwise indicate to an event organizer to create an event. An event administrator can include one or more human or artificial agents. In a specific implementation, an agent accesses a list of events represented as the historical events datastore 104 prior to initializing a new event data structure. An example of an events listing engine is described in more detail below with reference to the example of FIG. 2.

The event organization engine 108 is intended to represent an engine by which an event organizer can enrich an event data structure. An event organizer can include one or more human or artificial agents. There may or may not be cross-over between event administration and event organization. The event organization engine 108 generates (or updates) an event data structure represented by the pending events datastore 110. The event organization engine 108 also generates (or updates) persona data structures represented by the persona datastore 112.

The pending events datastore 110 is intended to represent the event data structure of a pending event. For illustrative simplicity, only one pending event is generally referenced in the description below but there could, of course, be multiple pending events occurring in parallel, which may or may not have location, resource, or data overlap.

The persona datastore 112 is intended to represent data structures defining human participants of an event. In a specific implementation, the persona datastore 112 also includes persona data structures defining human agents of an enterprise, third party service providers such as outside printing services, or the like. In some instances, at least some persona data structures include personally identifiable information (PII). Instead or in addition, some "fields" may have time-varying values that are computed for a given date and time and can be modified in response to dynamic changes. For example, a human can only be in one location at a time, and location may be relevant at the present time, historically (for prediction purposes), or at some future time (ideally as represented in a calendar).

The pre-event management engine 114 is intended to represent an engine used to allocate resources to an event and to manage participation in the event. Resources can include devices, conference rooms, software, remote access, wireless LAN access, rental property, and other resources that can be used in preparing for or conducting an event. Participants can include human agents of an enterprise playing a part in administering, organization, or managing the event, content providers (authors, artists, designers, speakers, etc.), and customers (prospects, visitors, registrants, attendees, etc.).

The pre-event management engine 114 includes an event planning subsystem 116 and a privacy policy compliant badge delivery subsystem 118. In a specific implementation, the event planning subsystem 116 is controlled by an enterprise that has access to PII in the persona datastore 112, and the privacy policy compliant badge delivery subsystem 118 is at least in part controlled by an entity that is not provided PII. This dynamic is described in more detail later by way of example with reference to FIGS. 4 and 5.

The attendee reception engine 120 is intended to represent an engine that operates at an ongoing event. The attendee reception engine 120 includes an event check-in subsystem 122 and a partially pre-printed badge distribution subsystem 124 for distributing partially pre-printed badges to the attendees. The attendee reception engine 120 is described in more detail later by way of example with reference to FIG. 6.

The event management engine 126 is intended to represent an engine associated with management of an ongoing event, as opposed to the pre-event management engine 114 (though there can, of course, be overlap between the two engines). In a specific implementation, the event management engine 126 updates the persona datastore 112 when new physical devices are discovered, such as when a smartphone is detected by a wireless access point. In such an implementation, if the attendee is represented in the persona datastore 112, the persona data structure can be linked to a data structure defining the relevant personal device when the association between the attendee and device becomes known. In a specific implementation, the persona datastore 112 can be augmented dynamically when a new person is discovered, such as via a security camera. In such an implementation, the device used to detect the person can be linked to the persona data structure in the persona datastore 112. The event management engine 126 updates the pending events datastore 110, as well, in what may be referred to as "event deltas." See, e.g., FIG. 4.

The event feedback prompting engine 128 is intended to represent an engine that functions during or after an event to further enrich the pending events datastore 110. It may be noted that the pending event could logically be considered a "historical event" and to prevent confusion, the pending event can be referred to as the "recent event" as its associated data structure is enriched via the event feedback prompting engine 128. In general, however, the pending events datastore 110 and the historical events datastore 104 can be treated as an events datastore with event data structures for past, present, and future events. The event feedback prompting engine 128 includes a session participation engine 130, which is described by way of example with reference to FIG. 7, and an event engagement engine 132, which is described by way of example with reference to FIG. 8.

The post-event management engine 134 is intended to represent an engine associated with management of a past (and/or recent) event, as opposed to the pre-event management engine 114 and the event management engine 126 (though there can, of course, be overlap between the three engines). Aspects of the event feedback prompting engine 128 can be considered part of post-event management, if applicable. For example, surveys may be sent to attendees by email after the event has concluded.

Figure 2:
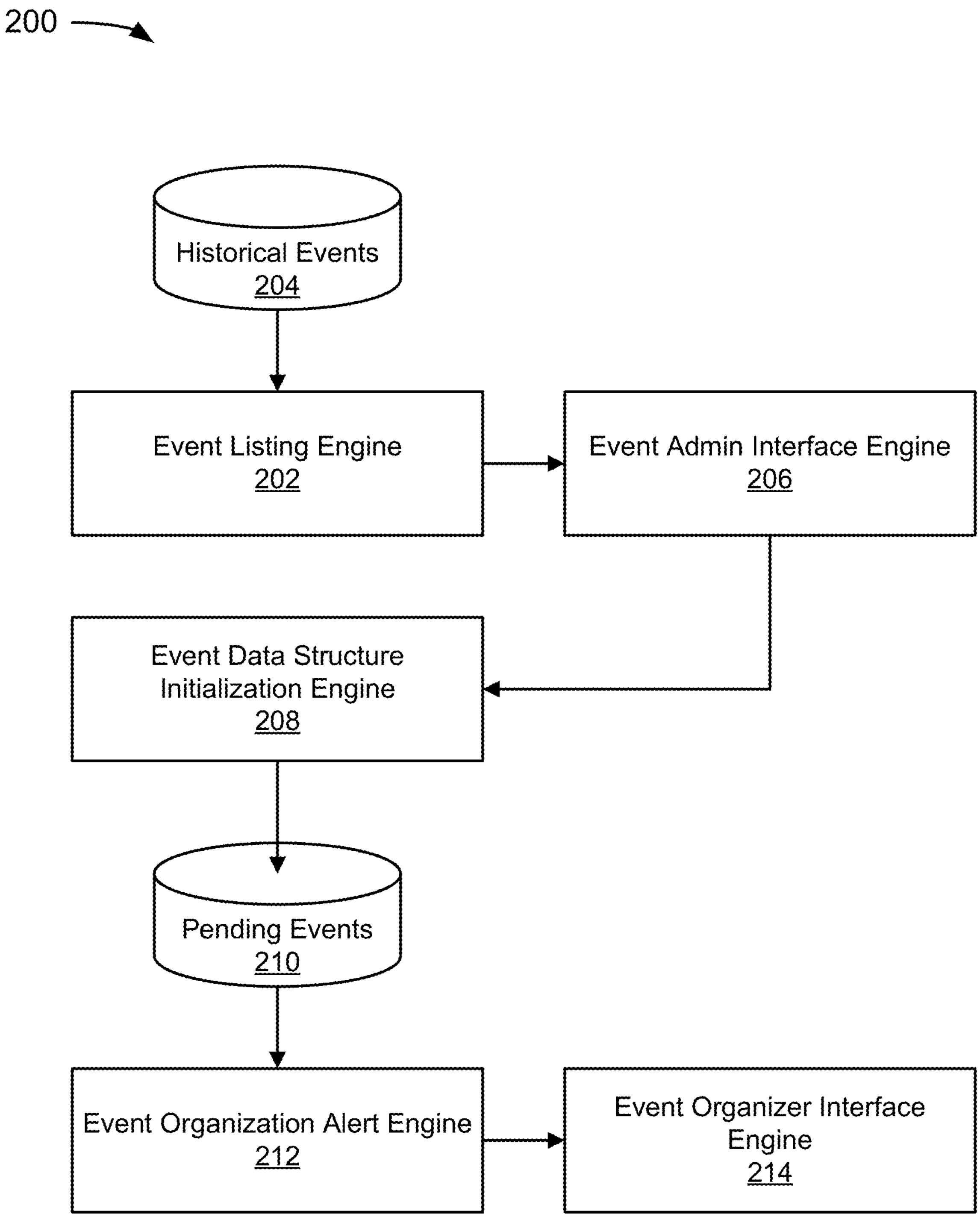
FIG. 2 depicts a diagram of an example of an event administration engine.

FIG. 2 depicts a diagram 200 of an example of an event administration engine. The diagram 200 is intended to represent an example of an event administration engine suitable for use as the event administration engine 106 of FIG. 1. The diagram 200 includes an event listing engine 202, a historical events datastore 204 coupled to the event listing engine 202, an event admin interface engine 206 coupled to the event listing engine 202, an event data structure initialization engine 208 coupled to the event admin interface engine 206, a pending events datastore 210 coupled to the event data structure initialization engine 208, an event organization alert engine 212 coupled to the pending events datastore 210, and an event organizer interface engine 214 coupled to the event organization alert engine 212.

The event listing engine 202 is intended to represent an engine that provides a listing of historical events from the historical events datastore 204 to an event administrator via the event admin interface engine 206. The event administrator, through the event admin interface engine 206, causes the event data structure initialization engine 208 to create an event data structure in the pending events datastore 210. The event data structure can include whatever default or other parameter values deemed appropriate by the administrator. The event organization alert engine 212 is intended to represent an engine that informs an event organizer that an event is pending (and needs to be organized) via the event organizer interface engine 214. It may be noted that the alert can be generated via a message or as a tag on an action item. As such, the alert may or may not be "sent" to the organizer.

Figure 3:
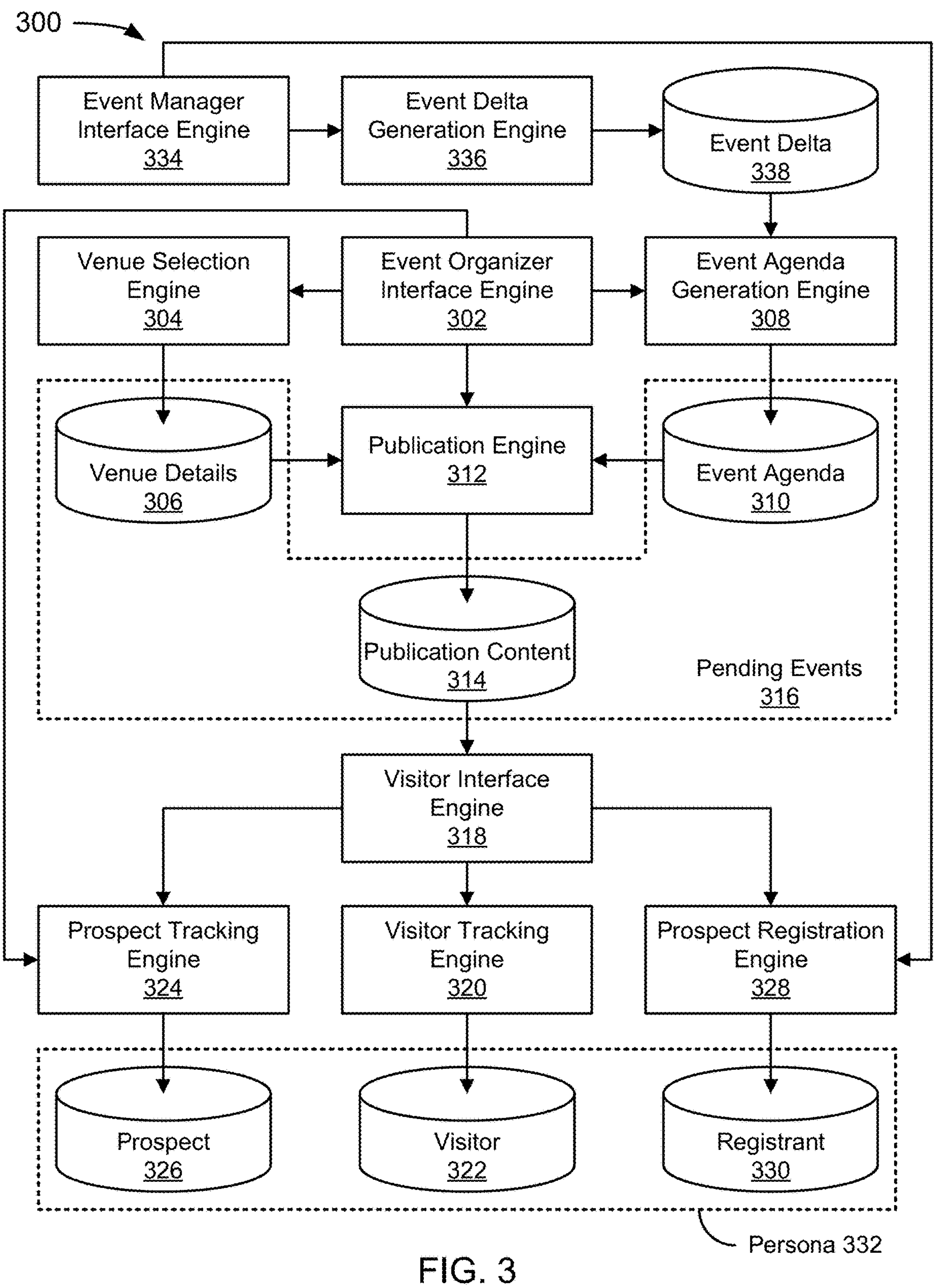
FIG. 3 depicts a diagram of an example of an event organization engine.

FIG. 3 depicts a diagram 300 of an example of an event organization engine. The diagram 300 is intended to represent an example of an event organization engine suitable for use as the event organization engine 108 of FIG. 1. The diagram 300 includes an event organizer interface engine 302; a venue selection engine 304 coupled to the event organizer interface engine 302; a venue details datastore 306 coupled to the venue selection engine 304; an event agenda generation engine 308 coupled to the event organizer interface engine 302; an event agenda datastore 310 coupled to the event agenda generation engine 308; a publication engine 312 coupled to the event organizer interface engine 302, the venue details datastore 306, and the event agenda datastore 310; a publication content datastore 314 coupled to the publication engine 312; a visitor interface engine 318 coupled to the publication content datastore 314; a visitor tracking engine 320 coupled to the visitor interface engine 318; a visitor datastore 322 coupled to the visitor tracking engine 320; a prospect tracking engine 324 coupled to the visitor interface engine 318; a prospect datastore 326 coupled to the prospect tracking engine 324; a prospect registration engine 328 coupled to the visitor interface engine 318; a registrant datastore 330 coupled to the prospect registration engine 328; an event manager interface engine 334 coupled to the prospect registration engine 328; an event delta generation engine 336 coupled to the event manager interface engine 334; and an event delta datastore 338 coupled to the event delta generation engine 336 and the event agenda generation engine 308.

The event organizer interface engine 302 is intended to represent an interface and associated engines through which an event organizer can access data associated with a pending event and can enter or update data as needed. The event organizer can include one or more human or artificial agents, or a combination thereof (e.g., some data entry may be automated and performed by an artificial agent, after which the data is reviewed by a human agent).

The venue selection engine 304 is intended to represent an engine through which an event organizer can access information about previous or new event venues. The venue selection engine 304 can enter values for parameters associated with a venue into the venue details datastore 306. Some values may be prepopulated, such as when a venue is reused or in accordance with a policy. The venue selection engine 304 can provide information about venues from third party sources, through search engines, or from a datastore of an enterprise for which the event organizer is acting as an agent. The venue details datastore 306 may or may not include PII.

The event agenda generation engine 308 is intended to represent an engine through which an event organizer can access information about previous or new events. The event agenda generation engine 308 can enter values for parameters associated with a pending event into the event agenda datastore 310. Some values may be prepopulated, such as when an event agenda with a similar format is reused or in accordance with a policy. The event agenda generation engine 308 can provide information about events from third party sources, through search engines, or from a datastore of an enterprise for which the event organizer is acting as an agent. The event agenda datastore 310 may or may not include PII.

The publication engine 312 is intended to represent an engine that generates content for publication. In a specific implementation, the publication engine 312 creates a webpage with information from the venue details datastore 306 and the event agenda datastore 310. In such an implementation, the webpage can be considered part of the publication content datastore 314. Other forms of publication can also be considered part of the publication content datastore 314, such as e-flyers, brochures, or the like.

The venue details datastore 306, the event agenda datastore 310, and the publication content datastore 314 can collectively be referred to as pending events datastore 316. The publication content datastore 314 is assumed to include no PII, though it should be understood that some content that serves to advertise an event could include PII, such as e-mail, messages, calendar invites, or the like. For illustrative purposes, such information is considered part of persona datastore 328, which is discussed later.

The visitor interface engine 318 is intended to represent an interface and associated engines through which a virtual or physical visitor can gain access to event details or otherwise become known to an event organizer agent.

The visitor tracking engine 320 is intended to represent an engine that stores data obtained via the visitor interface engine 318 in the visitor datastore 322. Data associated with a visitor is considered part of the visitor datastore 322. As such, the visitor tracking engine 320 can draw data from other sources, such as social media posts, news articles, demographic analysis engines, or the like. Over time, it may become known that a first (visitor) persona and a second persona are associated with a single human, which can result in multiple visitor personas being merged into one persona.

The prospect tracking engine 324 is intended to represent an engine that tracks personas that have been identified as event attendee prospects. The prospect tracking engine 324 can be characterized as including a prospect identification engine (not shown), as well. Prospects can include visitors, which makes the prospect datastore 326 potentially (at least conceptually) redundant with the visitor datastore 322 for certain personas. Prospects can also be identified through visitors or from other sources such that not all prospects are visitors (or initially visitors).

The prospect registration engine 328 is intended to represent an engine that creates a registrant data structure for the registrant datastore 330. The prospect registration engine 328 can be characterized as converting a prospect into a registrant. Registrants can include visitors, which makes the registrant datastore 330 potentially (at least conceptually) redundant with the visitor datastore 322 for certain personas. More generally, the visitor datastore 322, prospect datastore 326, and registrant datastore 330 comprise a persona datastore 332 that can treat personas as having one or more different roles, including visitor, prospect, and/or registrant (and, later, if applicable, attendee).

The event manager interface engine 334 is intended to represent an engine that enables an event manager or agent thereof to interact with the prospect registration engine to CRUD registrant data in the registrant datastore 330.

The event delta generation engine 336 is intended to represent an engine that creates an event delta data structure for the event delta datastore 338. In a specific implementation, an event manager or agent thereof provides event delta data to the event delta generation engine 336 via the event manager interface engine 334. An event delta is intended to represent an update to an event. In the context of FIG. 3, the event delta datastore 338 is used by the event agenda generation engine 308 to update an event agenda. However, the term "event delta" can be used for updating other aspects of the event at a later time, such as during or after the event, as dictated by context.

Figure 4:
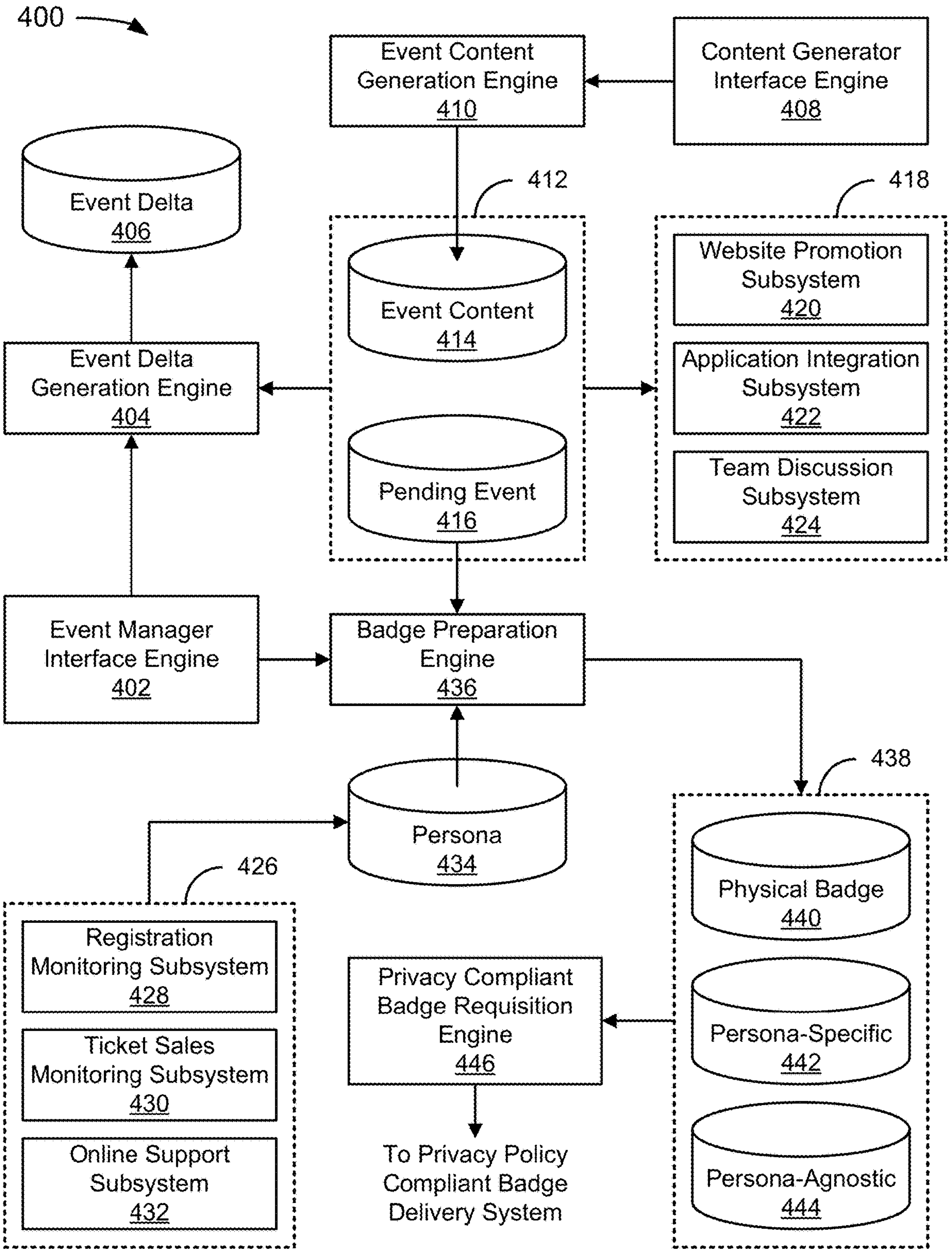
FIG. 4 depicts a diagram of an example of an event planning engine.

FIG. 4 depicts a diagram 400 of an example of an event planning engine. The diagram 400 is intended to represent an example of an event planning engine suitable for use as the event planning subsystem 116 of FIG. 1. The diagram 400 includes an event manager interface engine 402, an event delta generation engine 404 coupled to the event manager interface engine 402, an event delta datastore 406 coupled to the event delta generation engine 404, a content generator interface engine 408, an event content generation engine 410 coupled to the content generator interface engine 408, and a pending events datastore 412. The pending events datastore 412 comprises 1) an event content datastore 414 coupled to the event delta generation engine 404 and 2) a pending event datastore 416. The diagram 400 further includes an event management engine 418, coupled to the pending events datastore 412, that comprises by way of example a website promotion subsystem 420, an application integration subsystem 422, and a team discussion subsystem 424. The diagram 400 further includes a persona management engine 426 that comprises by way of example a registration monitoring subsystem 428, a ticket sales monitoring subsystem 430, and an online support subsystem 432. The diagram 400 further includes a persona datastore 434 coupled to the persona management engine 426; a badge preparation engine 436 coupled to the persona datastore 434, the event manager interface engine 402, and the pending event datastore 416; a badge datastore 438, which comprises a physical badge datastore 440, a persona-specific datastore 442, and a persona-agnostic datastore 444; and a privacy compliant badge requisition engine 446. In the example of FIG. 4, an arrow from the badge datastore 438 "to privacy policy compliant delivery system" is intended to illustrate at least some contents of the badge datastore 438 are made available to a privacy policy compliant badge delivery system.

The event manager interface engine 402 is intended to represent an engine similar to previously described event manager interface engines. See, e.g., the event manager interface engine 334 of FIG. 3.

The event delta generation engine 404 is intended to represent an engine that updates parameters of a pending event and stores the updates in the event delta datastore 406.

The content generator interface engine 408 is intended to represent an engine that provides an interface for a content owner or creator, or an agent thereof.

The event content generation engine 410 is intended to represent an engine that stores content in the event content datastore 414 of the pending events datastore 412. In a specific implementation, the event content generation engine 410 includes engines and datastores useful for facilitating the creation of content. In an alternative, the event content generation engine 410 takes content received from the content generator interface engine 408 and stores it in the event content datastore 414 (even an engine that essentially copies received content into a datastore is considered a content generation engine for the purposes of this paper).

The event management engine 418 is intended to represent an engine that CRUDs event parameter values in the pending events datastore 412 and takes action responsive to event parameters. For example, the website promotion subsystem 420 includes engines that promote a subset of the event content datastore (e.g., a website) in a process to improve content and/or increase exposure of a website to bring more visitors. Techniques such as search engine optimization and search engine submission can be used to increase traffic to a website once content is developed. Other similar engines can include a guerrilla marketing engine, a conversion rate optimization engine, a cross-device tracking engine, or the like.

As another example, the application integration subsystem 422 includes engines that facilitate communication between various types of business software such as supply chain management applications, ERP systems, CRM applications for managing customers, business intelligence applications, payroll, and human resources systems, as well as across other applications via application programming interfaces (APIs). Enterprise application integration is the process of linking such applications within a single organization together in order to simplify and automate business processes to the greatest extent possible, while at the same time avoiding having to make sweeping changes to the existing applications or data structures. More generally, application integration is the process of linking applications across different organizations, which may or may not be applicable in a given implementation. Applications can be linked either at the back end via APIs or at the front-end, typically via a GUI. Advantageously, an effective use of an application integration subsystem can make use of an insight generation engine to provide useful insights to agents of an enterprise associated with event data structures of the pending events datastore 412.

As another example, the team discussion subsystem 424 includes engines that facilitate communication and feedback from agents of an enterprise associated with event data structures of the pending events datastore 412. Team discussions can result in action items that lead to event updates (as described above), parked announcements (i.e., an announcement prepared in advance), or other feedback or action items associated with event management.

The persona management engine 426 includes engines that CRUD the persona datastore 434, facilitate interactions with real-world humans defined as persona data structures within the persona datastore 434, and otherwise take actions that can be attributed to a persona. For example, the registration monitoring subsystem 428 includes engines that monitor the changing state of a human in association with an event. In a specific implementation, such state can include visitor, prospect, registrant, attendee, or content provider. (Personas can also include other roles, such as administrator, organizer, manager, or the like.) As another example, the ticket sales monitoring subsystem 430 includes engines that monitor ticket sales to an event in association with agents of potential attendees. As another example, the online support subsystem 432 includes engines that facilitate providing assistance to visitors or other participants, and, in a specific implementation, updates the persona datastore 434 regarding an interaction with a participant or agent thereof. As used in this paper, a participant is any human or agent thereof who interacts with or is otherwise associated with an event; there is not necessarily a state associated with "participant," other than to the extent there is a state associated with various types of participants.

The badge preparation engine 436 is intended to represent an engine that enables an event manager or agent thereof to convert data from the pending event datastore 416 and, if applicable, the persona datastore 434 into the badge datastore 438. The physical badge datastore 440 includes parameters of a physical badge that is to be created for an attendee of an event. The physical badge can vary depending upon the event, enterprise, persona, or the like. The persona-specific datastore 442 includes parameters of a persona. As such, the parameters can include PII associated with a persona. The persona-agnostic datastore 444 includes parameters associated with an attendee but the parameters do not include PII. It may be noted that what counts as PII can vary depending upon context. In a specific implementation, PII is defined in accordance with enterprise policy. Instead or in addition, PII can be defined in accordance with law (e.g., General Data Protection Regulation (GDPR) compliance, Health Insurance Portability and Accountability Act (HIPPA) compliance, or the like).

The privacy compliant badge requisition engine 446 is intended to represent an engine that provides only such data as is compliant with an applicable privacy policy from the badge datastore 438 to a privacy compliant badge delivery system. In a specific implementation, the privacy compliant badge delivery system is an external printing agency. The external printing agency may or may not be aware of the applicable privacy policy, but can be characterized as a privacy compliant badge delivery system because the requisition request from (and any data made available by) the privacy compliant badge requisition engine 446 is privacy compliant. Requisition data can be made available via a cloud-based datastore, which can also be characterized as privacy policy compliant because only privacy compliant data is stored therein.

Figure 5:
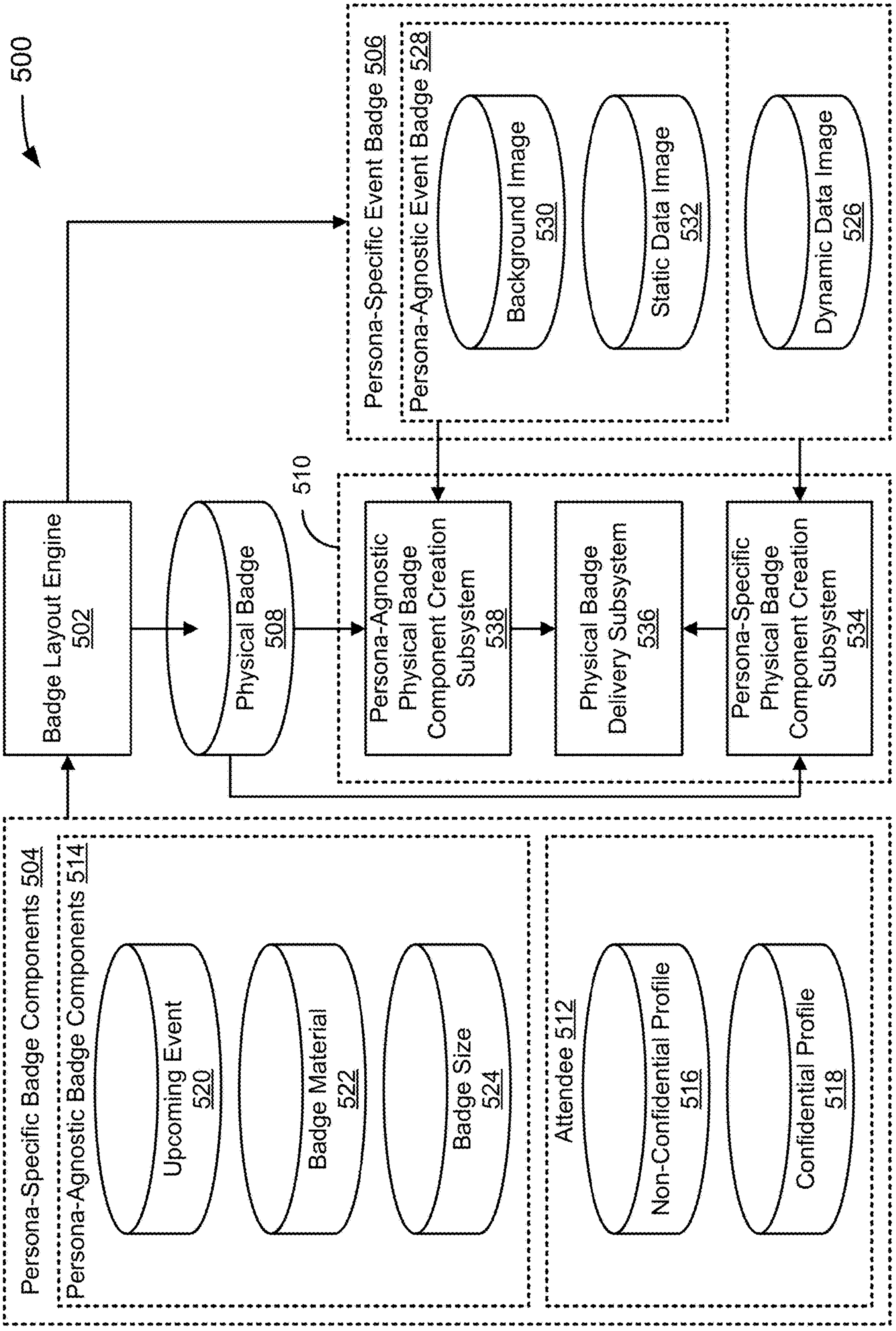
FIG. 5 depicts a diagram of an example of a privacy policy compliant badge delivery engine.

FIG. 5 depicts a diagram 500 of an example of a privacy policy compliant badge delivery engine. The diagram 500 is intended to represent an example of a privacy policy compliant badge delivery engine suitable for use as the privacy policy compliant badge delivery subsystem 118 of FIG. 1. The diagram 500 includes a badge layout engine 502, a persona-specific badge components datastore 504 coupled to the badge layout engine 502, a persona-specific event badge datastore 506 coupled to the badge layout engine 502, a physical badge datastore 508 coupled to the badge layout engine 502, and a badge assembly and delivery system 510. The persona-specific badge components datastore 504 includes an attendee datastore 512 that includes a non-confidential profile datastore 516 and a confidential profile datastore 518; and a persona-agnostic badge components datastore 514 that comprises an upcoming event datastore 520, a badge material datastore 522, and a badge size datastore 524. The persona-specific event badge datastore 506 includes a dynamic data image datastore 526 and a persona-agnostic event badge datastore 528 that comprises a background image datastore 530 and a static data image datastore 532. The badge assembly and delivery system 510 includes a persona-specific physical badge component creation subsystem 534 coupled to the physical badge datastore 508 and the persona-specific event badge datastore 506; a physical badge delivery subsystem 536 coupled to the persona-specific physical badge component creation subsystem 534; and a persona-agnostic physical badge component creation subsystem 538 coupled to the persona-agnostic event badge datastore 528, the physical badge delivery subsystem 536, and the physical badge datastore 508.

The badge layout engine 502 is intended to represent an engine that creates specifications for a physical badge to be created for an attendee of a real-world event. In a specific implementation, the badge layout engine 502 is a subsystem of a badge preparation engine, such as the badge preparation engine 436 described by way of example in FIG. 4. Instead or in addition, the badge layout engine 502 can be implemented as a component of an event planning subsystem or a privacy compliant badge delivery subsystem, such as the event planning subsystem 116 or the privacy policy compliant badge delivery subsystem 118 described by way of example in FIG. 1. In the illustrated embodiment, the badge layout engine 502 has access to persona-specific badge components from the persona-specific badge components datastore 504, which can include PII. In an alternative, the badge layout engine 502 could have access restricted to persona-agnostic badge components from the persona-agnostic badge components datastore 514. In yet another alternative, the badge layout engine 502 could have access restricted to persona-agnostic badge components from the persona-agnostic badge components datastore 514 and non-confidential profile information from the non-confidential profile datastore 516.

The persona-specific badge components datastore 504 is intended to represent badge parameters used for the creation of at least a portion of a badge for an attendee of an event. The attendee datastore 512 is intended to represent a component of a persona datastore that relates to personas with attendee status. The non-confidential profile datastore 516 is intended to represent parameters of an attendee for which values are non-confidential as determined by a privacy policy. The confidential profile datastore 518 is intended to represent parameters of an attendee for which values are confidential as determined by a privacy policy. In a specific implementation, the non-confidential profile datastore 516 and the confidential profile datastore 518 are first and second components of a persona datastore, such as the persona datastore 112 described by way of example with reference to FIG. 1, the persona datastore 332 described by way of example with reference to FIG. 3, or the persona datastore 434 described by way of example with reference to FIG. 4.

The persona-agnostic badge components datastore 514 is intended to represent parameters with values useful to an agent responsible for laying out badges for an event that, for illustrative purposes at least, does not include data specific to attendees. In a specific implementation, the upcoming event datastore 520 is a first component, the badge material datastore 522 is a second component, and the badge size datastore 524 is a third component of a pending events datastore, such as the pending events datastore 110 described by way of example with reference to FIG. 1, the pending events datastore 210 described by way of example with reference to FIG. 2, the pending events datastore 316 described by way of example with reference to FIG. 3, or the pending events datastore 412 described by way of example with reference to FIG. 4. In an alternative, a historical events datastore, such as the historical events datastore 104 described by way of example with reference to FIG. 1, is also included in the persona-agnostic badge components datastore 514 for reference purposes (e.g., to use data associated with previous events, such as badge images).

The upcoming event datastore 520 is intended to represent parameters with values associated with a specific upcoming event that is useful to an agent responsible for laying out badges for that event. The badge material datastore 522 is intended to represent parameters with values defining materials with which a badge is made. The badge material datastore 522 may or may not include precise badge material definitions. In an implementation in which badge material definitions are imprecise, a third party may be responsible for manufacturing and/or assembling badges without explicit direction regarding badge material (or all badge components). The badge size datastore 524 is intended to represent parameters with values defining one or more badge sizes appropriate for an upcoming event. Badge materials and badge sizes may be uniform or varying depending upon attendee status.

The persona-specific event badge datastore 506 is intended to represent badge parameters for provisioning to one or more badge assembly subsystems. In a specific implementation, the dynamic data image datastore 526 is a first component of a pending event datastore, such as the pending events datastore 110 described by way of example with reference to FIG. 1, the pending events datastore 316 described by way of example with reference to FIG. 3, or the pending events datastore 412 described by way of example with reference to FIG. 4; and the persona-agnostic event badge datastore 528 is a second component of a pending event datastore, such as the pending events datastore 110 described by way of example with reference to FIG. 1, the pending events datastore 316 described by way of example with reference to FIG. 3, and the pending events datastore 412 described by way of example with reference to FIG. 4. The dynamic data image datastore 526 is intended to represent parameters with values that include attendee information. Depending upon implementation-specific, configuration-specific, or other factors, the attendee information may or may not include confidential information and/or PII.

The persona-agnostic event badge datastore 528 is intended to represent parameters with values that include information about an event that does not include attendee information. The background image datastore 530 is intended to represent one or more images to be depicted on each badge at an event. The static data image datastore 532 is intended to represent one or more images to be depicted on some but not all badges at an event. Depending upon implementation-specific, configuration-specific, or other factors, it may be the case that only one of the background image datastore 530 or the static image datastore 532 is utilized.

The persona-specific physical badge component creation subsystem 534 is intended to represent one or more engines that use the dynamic data image datastore 526 and the persona-agnostic event badge datastore 528, along with the physical badge datastore 508, to create physical badge components for badges to be used at the event. As is discussed later, e.g., with reference to FIG. 6, badges are provided at an event in accordance with a queuing time hypothesis. If a fully printed badge is provided, that implies the dynamic data image datastore 526 is used to create badge components that include confidential information or PII because such information (e.g., an attendee's name) is typically used. A partially printed badge can also make use of the dynamic data image datastore 526 to the extent the partially printed badge can be at least partially personalized for an attendee, with some (likely more sensitive or currently unknown) information being printed later.

The physical badge delivery subsystem 536 is intended to represent one or more engines that deliver components of a physical badge, including the physical badge itself, to an event location. In a specific implementation, the physical badge delivery subsystem 536 provides a blank badge that may or may not have a pocket for an insert that can house a name or other information outward-facing when the badge is worn. Instead or in addition to a pocket, the badge can be used with a label that is affixed to a surface of the badge. Where the badge includes a dynamic data image, the badge can have the dynamic data image printed onto a surface of the badge or onto a preprinted insert or label. A preprinted insert or label may or may not be inserted into or affixed to a badge prior to delivery. For example, a badge could be delivered with a preprinted insert in a pocket or preprinted label affixed to the badge, or the badge could be delivered with a preprinted insert or label that is separate from the badge. Advantageously, a badge can be customized for personas without deviating from privacy protocols while still preprinting badge components using an external (to the relevant enterprise) printing agency. For example, badge components can be printed for attendees from a particular location (e.g., a country, company, or the like), indicating the location on the badge without exposing the name of the attendee and therefore not running afoul of privacy protocols, then print only the name of the attendee on site to conserve printing resources, including both time, paper/labels, ink, and the like. Thus, dynamic data images can be used to provide as much information as possible without, for example, providing information that can be legally characterized as PII within relevant jurisdictions. Similarly, where the badge includes a background image and a dynamic data image, the badge can have the background image and the dynamic data image printed onto a surface of the badge or onto a preprinted insert or label. Similarly, where the badge includes a static data image and a dynamic data image, the badge can have the static data image and the dynamic data image printed onto a surface of the badge or onto a preprinted insert or label. Similarly, where the badge includes a background image, a static data image, and a dynamic data image, the badge can have the background image, the static data image, and the dynamic data image printed onto a surface of the badge or onto a preprinted insert or label.

The persona-agnostic physical badge component creation subsystem 538 is intended to represent one or more engines that use the persona-agnostic event badge datastore 528, along with the physical badge datastore 508, to create physical badge components for badges to be used at the event. Where the badge includes a background image, the badge delivered by the physical badge delivery subsystem 536 can have the background image printed onto a surface of the badge or onto a preprinted insert or label. A preprinted insert or label may or may not be inserted into or affixed to a badge prior to delivery. For example, a badge could be delivered with a preprinted insert in a pocket or preprinted label affixed to the badge, or the badge could be delivered with a preprinted insert or label that is separate from the badge. Similarly, where the badge includes a static data image, the badge can have the static data image printed onto a surface of the badge or onto a preprinted insert or label. Similarly, where the badge includes a background image and a static data image, the badge can have the background image and the static data image printed onto a surface of the badge or onto a preprinted insert or label.

Figure 6:
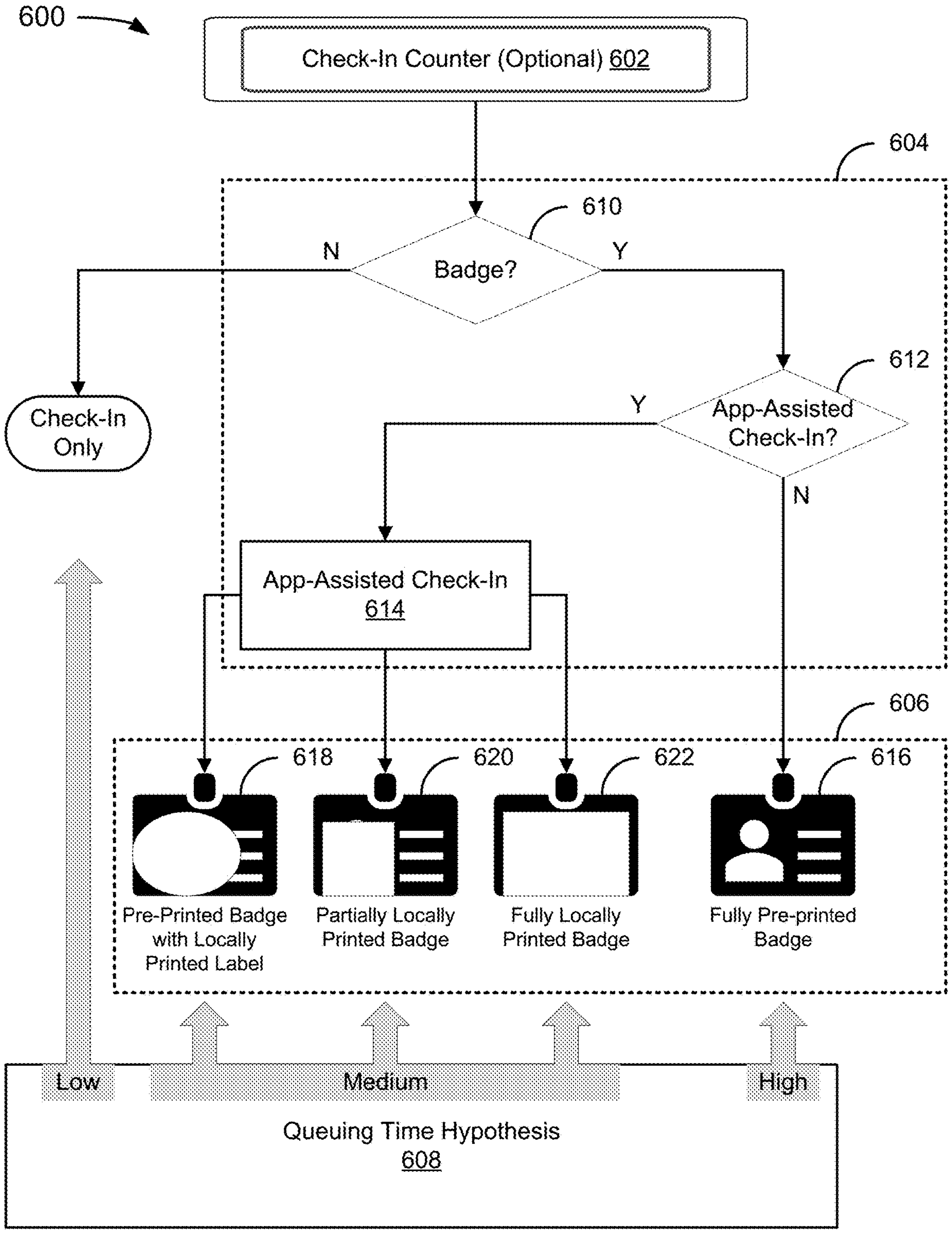
FIG. 6 depicts a diagram of an example of an attendee reception engine.

FIG. 6 depicts a diagram 600 of an example of an attendee reception system. The diagram 600 includes an optional check-in counter 602, an attendee reception engine 604, printed badges 606, and a queueing time hypothesis 608. In a specific implementation, at least one of the printed badges 606 is a partially pre-printed badge.

The check-in counter 602 is intended to represent a table or other physical structure from which the printed badges 606 can be positioned for provisioning to attendees at an event. The check-in counter 602 is optional because there may be no badges or the check-in counter 602 could be rendered unnecessary for other reasons.

The attendee reception engine 604 includes a decision point 610, a decision point 612, and a block 614, which are intended to illustrate functionality, though not necessarily the temporal order of decisions, of one or more engines, including hardware and software, involved in checking in attendees at an event. The hardware can include devices of agents of the event, devices of attendees of the event, network devices, or the like. The software can include applications running on devices of agents or attendees of the event, programs running on a server or in the cloud, or the like.

Conceptually (though not necessarily temporally), starting at the decision point 610 it is determined whether one of the printed badges 606 is to be provisioned to an attendee. If no printed badge is to be provisioned to the attendee (610—N), the attendee has a status of "check-in only" because no printed badge is required. A human could show up who is not supposed to attend the event and would not be granted a printed badge, but a scenario in which a human who is present but is not an attendee is considered outside the scope of this paper. Guests, on the other hand, could become attendees by an agent of the event allowing the guest in, with (as described later) or without (check-in only status) one of the printed badges 606. In a specific implementation, when guest status changes to attendee, an agent of the event creates a persona for the guest or updates a persona associated with the guest to attendee status in a persona datastore. Depending upon implementation-specific, configuration-specific, attendee-specific, or other factors, some attendees may be given a printed badge while other attendees are not.

If it is determined a printed badge is to be provisioned to the attendee (610—Y), then conceptually (though not necessarily temporally) it is determined whether app-assisted check-in is conducted at decision point 612. For practical reasons, without app-assisted check-in, event protocol entails either check-in only (described previously) or fully printed badge provisioning (described later) to attendees (612—N). Instead or in addition, attendees could be provided with a blank badge, a label, and a pen, and asked to write their name upon the label with the pen and affix the label to the blank badge. Depending upon implementation-specific, configuration-specific, attendee-specific, or other factors, some attendees may check-in with app assistance while other attendees do not.

If it is determined app-assisted check-in is used (612—Y), then conceptually (though not necessarily temporally) app-assisted check-in is conducted at app-assisted check-in module 614. In a specific implementation, app-assisted check-in begins (at least conceptually) with a persona achieving registered status. When a persona is registered for an event, the human associated with the persona is expected to be an attendee. To the extent a distinction is important, it may be noted that registrant status does not actually become attendee status until a persona datastore is updated accordingly, but where a strict distinction is unnecessary for understanding, a human who is both supposed to be at an event and is at the event (though not necessarily through check-in) may be referred to as an attendee in this paper even though attendee status may be pending.

Between the time of registration and the time of check-in at the event, the persona of the registrant may or may not be updated in a manner that impacts printed badge appearance. For example, registration may not require a photo but a persona datastore can be updated to include a photo later, which may be included on one of the printed badges 606. Other updates can include changes in employment, name changes, or the like.

Upon arrival at an event location, registrant status can be updated to present status prior to check-in. In a specific implementation, a registrant alerts an event management engine of registrant presence via an application GUI on a smartphone. In an alternative, the event management engine can become aware of the presence of a registrant by detecting a device that has been identified in a persona datastore as that of the registrant, such as a smartphone identified by MAC address or IP address, an RFID tag that was provided to the registrant in advance of attending the event, through face recognition software, or via some other technique. Instead or in addition, a registrant can be asked to login to a computer system, such as a tablet near the entrance of an event location, such that when the registrant reaches the check-in counter 602, preprocessing (e.g., badge printing) associated with the registrant can be conducted. Depending upon the technique utilized, the registrant's place in a check-in queue can be precise or can have more limited precision.

Upon reaching the check-in counter 602 (assuming there is one), registrant status (or present status, if applicable) can be updated to attendee status and the attendee can be provided with one of the printed badges 606. In some instances, updating to attendee status is after-the-fact by way of a paper login sheet indicating attendance that is converted to electronic form for the purpose of updating a persona datastore.

The printed badges 606 include one or more of a fully pre-printed badge 616, a pre-printed badge with locally printed label 618, a partially locally printed badge 620, or a fully locally printed badge 622. In the example of FIG. 6, it is assumed the locally printed badges are provisioned as part of app-assisted check-in while the fully pre-printed badge is provisioned without app-assisted check-in. In an alternative implementation in which some attendees are checked in with app assistance while others are not, those who do not use app-assisted check-in could be provisioned a pre-printed badge. However, in this rare circumstance, it should be understood the pre-printed badges may be generic (or "guest") badges that are, in accordance with the parlance used in this paper, not "fully pre-printed." The distinction is a fully pre-printed badge as used in this paper includes a dynamic data image.

The queuing time hypothesis 608 is not intended to necessarily represent an engine but rather helps to illustrate a rationale for provisioning the printed badges 606 as described in this paper. In a first scenario, a first attendee is not provisioned a badge (610—N), which has the lowest queuing time hypothesis because the first attendee need not even stand in a queue for the purpose of obtaining a printed badge. An advantage of check-in only is the low queuing time hypothesis, but a disadvantage is the first attendee is not provisioned with a printed badge. It is generally seen as more valuable by event organizers for attendees to have badges than to avoid a queue.

In a second scenario, a second attendee is provisioned the fully-printed badge 616, which has the highest queuing time hypothesis because the second attendee must stand in a queue for the purpose of being provisioned a specific badge. An advantage of fully pre-printed badges is obviating utilization of local resources associated with printing, such as time, ink, labels/inserts, printer maintenance, and the like. A disadvantage is the badges must be inventoried; if an external printing agency is utilized, potentially confidential information may be exposed during the request (typically in the form of electronic data) or delivery of the physical badges, as well as potential risks if the badges are improperly stored; and if the badges are damaged, local resources must be utilized and may be under-provisioned due to the presumed lack of necessity for utilizing such resources.

In a third scenario, a third attendee is provisioned the pre-printed badge with a locally printed label 618, which has a medium queuing time hypothesis because the attendee must stand in a queue for the purpose of being provisioned a badge. However, printing time is reduced because the badges include pre-printed background and/or static data images and individual badges need not be kept in order because they are customized only with the local printing. Advantages of pre-printed badges with locally printed labels are that potentially confidential information need not be shared with an external printing agency and the badges do not include such information when kept in storage; it is also generally easier to be responsive to some badges being damaged or to the arrival of guests who did not pre-register. A disadvantage is labels tend to be viewed as relatively unappealing from an aesthetic perspective.

In a fourth scenario, a fourth attendee is provisioned a partially locally printed badge 620, which has a medium queuing time hypothesis because the attendee must stand in a queue for the purpose of being provisioned a badge. However, printing time is reduced because the badges include pre-printed background and/or static data images and individual badges need not be kept in order because they are customized only with the local printing. Advantages of partially locally printed badges are potentially confidential information need not be shared with an external printing agency and the badges do not include such information when kept in storage; it is also generally easier to be responsive to some badges being damaged or to the arrival of guests who did not pre-register. With appropriate resources, partially locally printed badges can be as aesthetically appealing as fully printed badges; that the badges are locally printed can be practically undetectable. A disadvantage is local resources associated with partial printing must be utilized, but this can be ameliorated by taking advantage of app-assisted check-in to start printing for registrants with a present status, which can reduce wait time.

In such an instance, the badges can be printed at login and placed on the check-in counter 602 for pickup when the applicable registrant reaches the check-in counter 602, which keeps the number of badges at the check-in counter 602 to a controllable number. Ideally, the time to reach the check-in counter 602 matches the time it takes to become aware a registrant has a present status, prepare a badge for the registrant, and make the badge available at the check-in counter 602.

In a fifth scenario, a fifth attendee is provisioned a fully locally printed badge 622, which has a medium queuing time hypothesis because the attendee must stand in a queue for the purpose of being provisioned a badge. However, individual badges need not be kept in order because they are not customized prior to the local printing. Advantages of fully locally printed badges are potentially confidential information need not be shared with an external printing agency and the badges do not include such information when kept in storage; it is also generally easier to be responsive to some badges being damaged or to the arrival of guests who did not pre-register. A disadvantage is local resources associated with full printing are heavily utilized, but this can be ameliorated by taking advantage of app-assisted check-in to start printing for registrants with a present status, which can reduce wait time. In such an instance, the badges can be printed at login and placed on the check-in counter 602 for pickup when the applicable registrant reaches the check-in counter 602, which keeps the number of badges at the check-in counter 602 to a controllable number. Ideally, the time to reach the check-in counter 602 matches the time it takes to become aware a registrant has a present status, prepare a badge for the registrant, and make the badge available at the check-in counter 602.

In a specific implementation, the first scenario is prohibited, and the second and third scenarios are emergency backup scenarios. In practice, the fifth scenario has a higher queuing time than the fourth scenario. Accordingly, in a specific implementation, the fully locally printed badges 622 are only utilized as a backup, such as if there are fewer partially printed badges than attendees, requiring additional badges be prepared from blank badge components. It may still be desirable to partially pre-print (though locally) and then add dynamic data images as needed by, e.g., relying upon app-assisted check-in to become aware of present status or to react to an attendee at the check-in counter 602 in need of a badge. Advantageously, partially locally printed badges with prior local pre-printing can enable greater throughput than fully locally printing badges because the pre-printing, even though happening at the event location, does not result in organizational bottlenecks and the partially pre-printed badges can be relatively rapidly delivered to agents who wish to complete printing of a badge for a present registrant.

Figure 7:
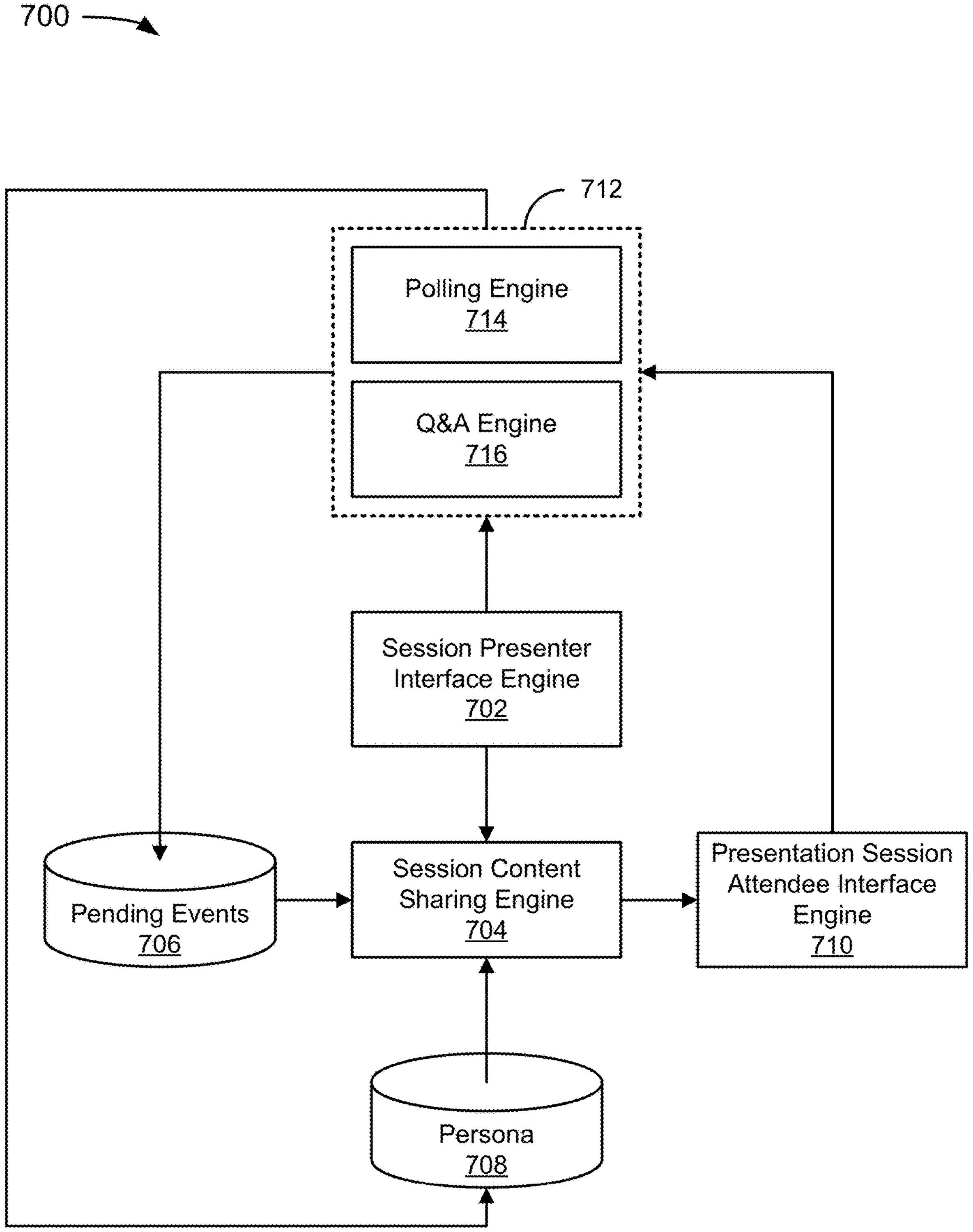
FIG. 7 depicts a diagram of an example of a session participation engine.

FIG. 7 depicts a diagram 700 of an example of a session participation engine. The session participation engine is intended to represent an engine that operates in parallel (temporally) with a presentation session at an event and facilitates communication between a session presenter or agent thereof and session attendees. The diagram 700 includes session presenter interface engine 702, a session content sharing engine 704 coupled to the session presenter interface engine 702, a pending events datastore 706 coupled to the session content sharing engine 704, a persona datastore 708 coupled to the session content sharing engine 704, a presentation session attendee interface engine 710 coupled to the session content sharing engine 704, and a presentation engagement engine 712 coupled to the session presenter interface engine 702, the pending events datastore 706, the persona datastore 708, and the presentation session attendee interface engine 710. The presentation engagement engine 712 includes a polling engine 714 and a question and answer (Q&A) engine 716.

The session presenter interface engine 702 is intended to represent an interface and associated engines through which a session presenter can access and update data associated with a pending event, and specifically in the context of FIG. 7, an ongoing presentation session at an event. The session presenter can include one or more human or artificial agents.

The session content sharing engine 704 is intended to represent an engine that provides content from the pending events datastore 706 for presentation on a personal device of a session attendee. In a specific implementation, the session content sharing engine 704 includes a presentation device, such as a big-screen display on which content can be displayed, instead of or in addition to presentation on a personal device of a session attendee.

The pending events datastore 706 is intended to represent a datastore that includes data like that of the pending events datastore 110 described by way of example with reference to FIG. 1, the pending events datastore 210 described by way of example with reference to FIG. 2, the pending events datastore 316 described by way of example with reference to FIG. 3, or the pending events datastore 412 described by way of example with reference to FIG. 4. A session presenter could conceivably augment session content with data that is not in the pending events datastore 706, such as physical props and, of course, sounds and gestures coming directly from the presenter.

The persona datastore 708 is intended to represent a datastore that includes data structures associated with session attendees.

The presentation session attendee interface engine 710 is intended to represent an engine through which content from the pending events datastore 706 is presented on a device of a session attendee who is represented in the persona datastore 708. In a specific implementation, the device of the session attendee includes an application installed on a smartphone; the application can be a mobile app, a web app, or some other applicable type of application software. The application can be specific to the event, event-related software that is operable across multiple events, or more general (e.g., a browser) software that provides access to a location (e.g., a webpage) associated with the event and through which the attendee can receive content. Depending upon implementation-specific, configuration-specific, or other factors, the session attendee represented in the persona datastore 708 is not necessarily identifiable in association with activities of the presentation engagement engine 712 (such as when taking polls or providing feedback).

The presentation engagement engine 712 is intended to represent an engine that receives messages from (or otherwise obtains information pertaining to) a session presenter through the session presenter interface engine 702 or an attendee through the presentation session attendee interface engine 710. In a specific implementation, the presentation engagement engine 712 receives commands from a session presenter through the session presenter interface engine 702 and input from an attendee through the presentation session attendee interface engine 710. Instead or in addition, information can be provided through other devices, such as cameras, microphones, an agent of an event manager, or the like.

The polling engine 714 is intended to represent an engine that monitors attendee responses to polls and updates the pending events datastore 706 accordingly. If applicable, the session content sharing engine 704 then displays the results of the poll after a span of time or upon receipt of a command to do so from the session presenter or agent thereof through the session presenter interface engine 702. In a specific implementation, a parameterized interaction via the presentation session attendee interface engine 710 is linked to a persona in the persona datastore 708 by including a parameter that identifies the persona.

The Q&A engine 716 is intended to represent an engine that receives questions from attendees and updates the pending events datastore 706 accordingly. If applicable, the session content sharing engine 704 then displays the question after a span of time or upon receipt of a command to do so from the session presenter or agent thereof through the session presenter interface engine 702. In an alternative, the question can be provided to the session presenter or agent thereof without displaying the question to attendees. An answer to a question may or may not be recorded in the pending events datastore 706. For example, a session presenter may answer the question verbally without recording it, or the answer could be entered via text, recorded and stored, or memorialized in some other fashion in the pending events datastore 706. In a specific implementation, a parameterized interaction via the presentation session attendee interface engine 710 is linked to a persona in the persona datastore 708 by including a parameter that identifies the persona.

Figure 8:
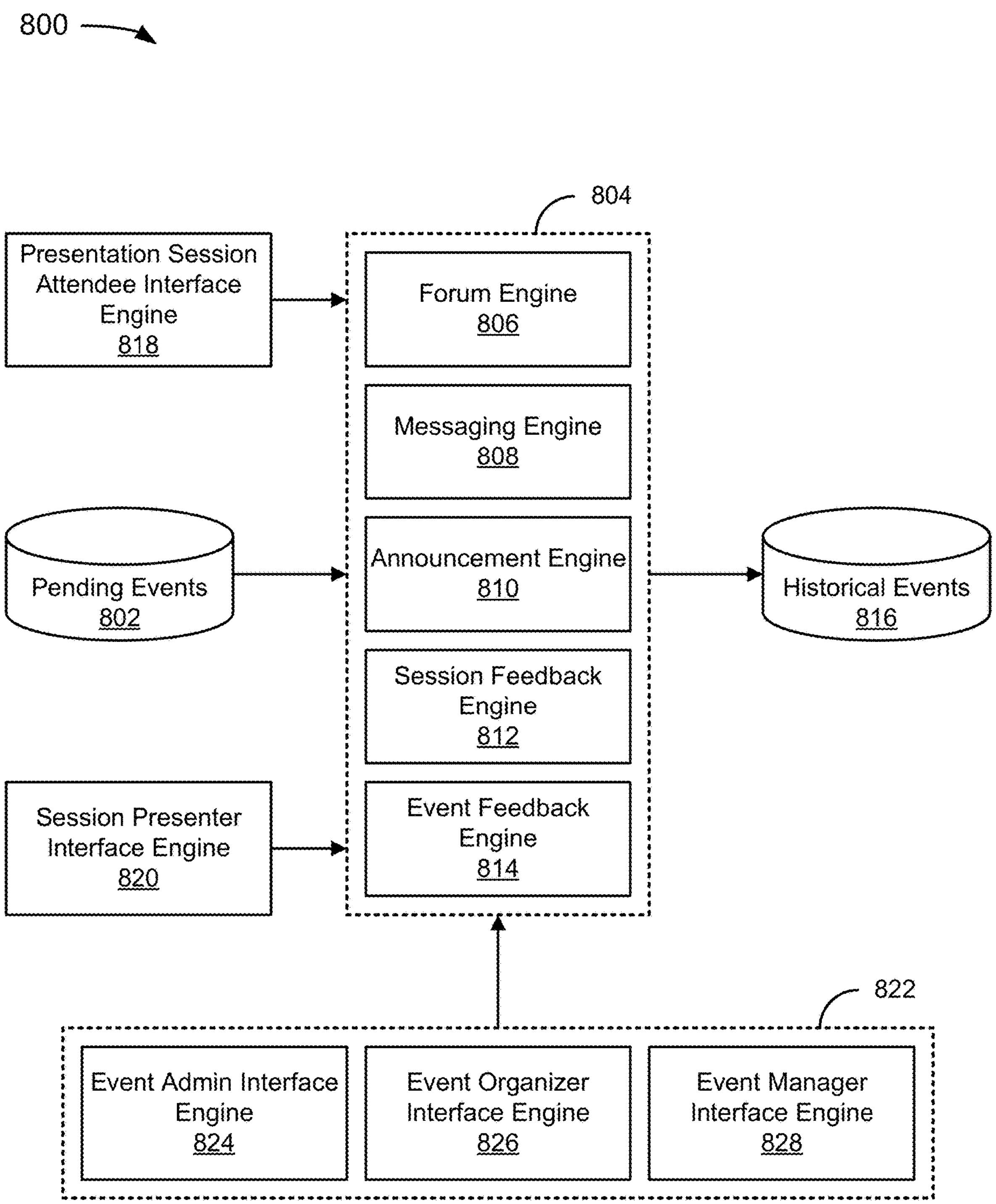
FIG. 8 depicts a diagram of an example of an event engagement engine.

FIG. 8 depicts a diagram 800 of an example of an event engagement engine. The diagram 800 includes a pending events datastore 802, an off-presentation engagement engine 804 coupled to the pending events datastore 802, a historical events datastore 816 coupled to the off-presentation engagement engine 804, a presentation session attendee interface engine 818 coupled to the off-presentation engagement engine 804, a session presenter interface engine 820 coupled to the off-presentation engagement engine 804, and an event agent interface engine 822 coupled to the off-presentation engagement engine 804. The off-presentation engagement engine 804 includes a forum engine 806, a chat engine 808, an announcement engine 810, a session feedback engine 812, and an event feedback engine 814. The event agent interface engine 822 includes an event admin interface engine 824, an event organizer interface engine 826, and an event manager interface engine 828.

The pending events datastore 802 is intended to represent a datastore that includes data like that of the pending events datastore 110 described by way of example with reference to FIG. 1, the pending events datastore 210 described by way of example with reference to FIG. 2, the pending events datastore 316 described by way of example with reference to FIG. 3, the pending events datastore 412 described by way of example with reference to FIG. 4, or the pending events datastore 706 described by way of example with reference to FIG. 7.

The off-presentation engagement engine 804 is intended to represent an engine that includes one or more sub-engines configured to facilitate engagement with individuals interested in a prior presentation (though some of the activities described here could be conducted in advance of or during an event), a person involved in the presentation, such as the presenter, or a topic related to the presentation. In a specific implementation, an engine of the one or more sub-engines is configured to facilitate engagement with individuals interested in a prior event, as opposed to a specific prior session, an organization associated with the event, or topics generally related to the event.

The forum engine 806 is intended to represent an engine that manages forums associated with a prior presentation. The messaging engine 808 is intended to represent an engine that provides a short messaging service (SMS), text messaging service, chat service, email service, or some other communication service for individuals associated with a prior presentation. The announcement engine 810 is intended to represent an engine that delivers to individuals associated with a prior presentation—for the purpose of providing information about a prior presentation, a future presentation, or a future event-a statement, a news release, an advertisement, a parked announcement, or some other announcement. In a specific implementation, the announcement is made publicly available, such as by publication on a webpage, delivery to a media outlet, delivery to a physical or virtual flyer production entity for eventual distribution, or the like. The session feedback engine 812 is intended to represent an engine that obtains feedback regarding a presentation session or aspects associated therewith. The event feedback engine 814 is intended to represent an engine that obtains feedback regarding an event or aspects associated therewith.

The historical events datastore 816 is intended to represent a datastore that includes data like that of the historical events datastore 104 described by way of example with reference to FIG. 1 or the historical events datastore 204 described by way of example with reference to FIG. 2.

The presentation session attendee interface engine 818 is intended to represent an engine through which a session attendee interacts with the off-presentation engagement engine 804. In a specific implementation, the interaction is at least in part parameterized to include a persona parameter and stored in the historical events datastore 816. The persona parameter identifies a persona.

The presentation session attendee interface engine 818 is intended to represent an engine through which access to the off-presentation engagement engine 804 is accomplished for an interested party or agent thereof. Depending upon implementation-specific, configuration-specific, or other factors, engagement could precede or be concurrent with a session, in addition to following a session. In a specific implementation, the interested party is represented in a persona datastore even if the interested party cannot be identified and, later, a first persona data structure associated with the interested party can be linked to a second persona data structure when it is determined the first and second persona data structures define the same person.

The session presenter interface engine 818 is intended to represent an engine through which access to the off-presentation engagement engine 804 is accomplished for a session presenter or agent thereof. Depending upon implementation-specific, configuration-specific, or other factors, engagement could precede or be concurrent with a session, in addition to following a session.

The event agent interface engine 822 is intended to be similar to the session presenter interface engine 820 but is used by other human or artificial agents of the event provider and, if applicable, parties associated with the event provider.

Figure 9:
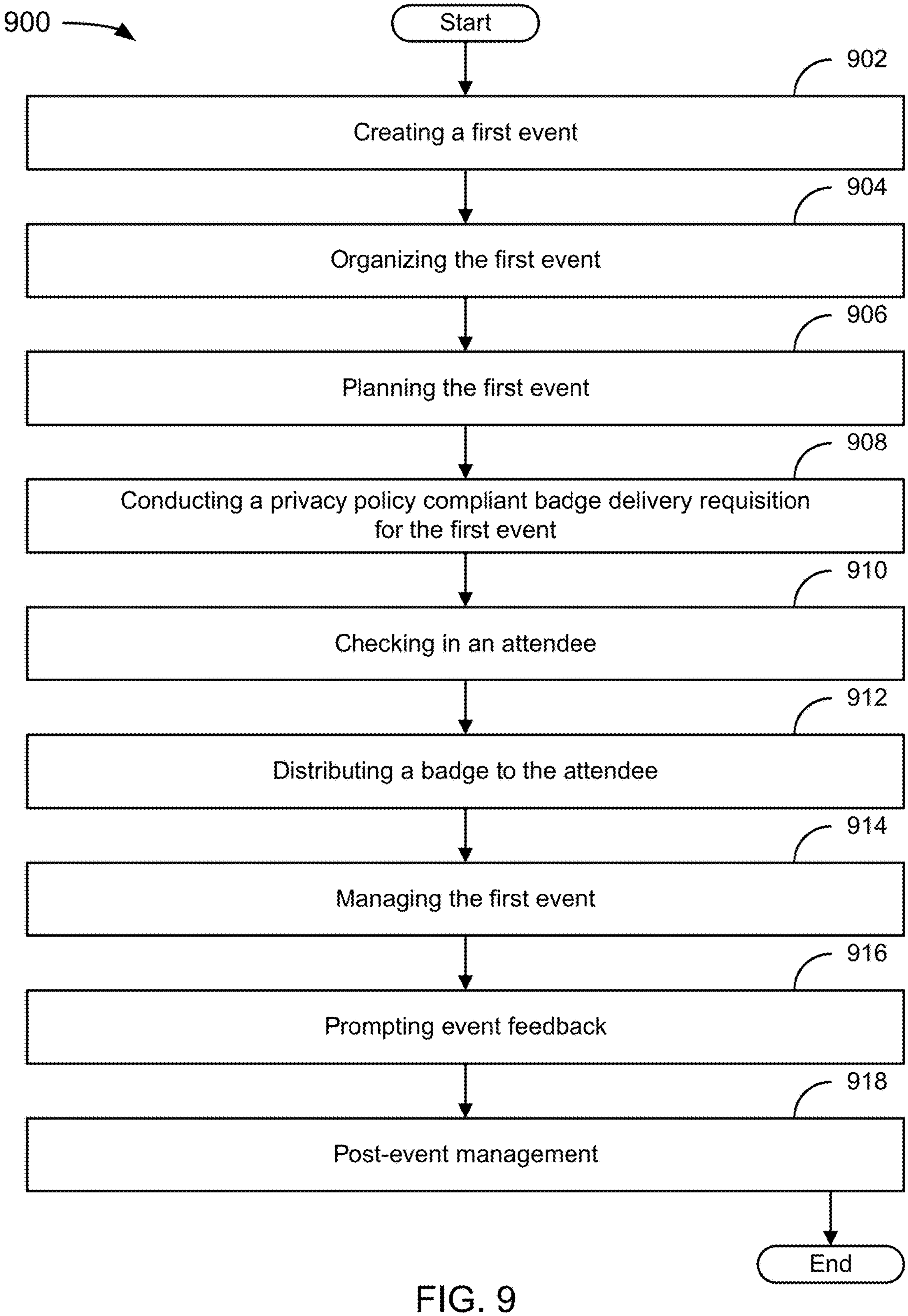
FIG. 9 depicts a flowchart of an example of a method for event planning and management with persona-agnostic and persona-specific badges for participants.
Figure 10:
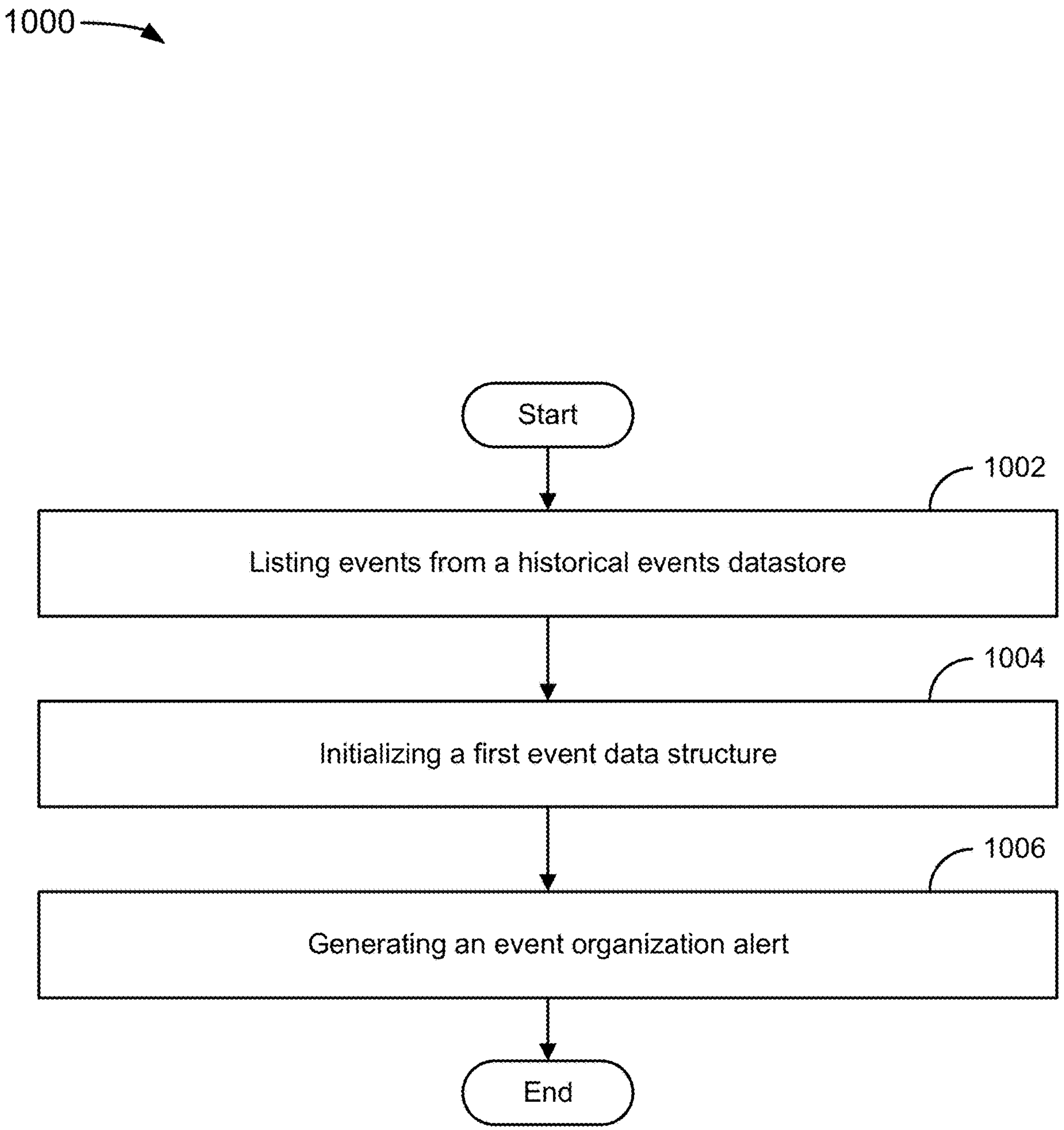
FIG. 10 depicts a flowchart of an example of a method for event administration.
Figure 11:
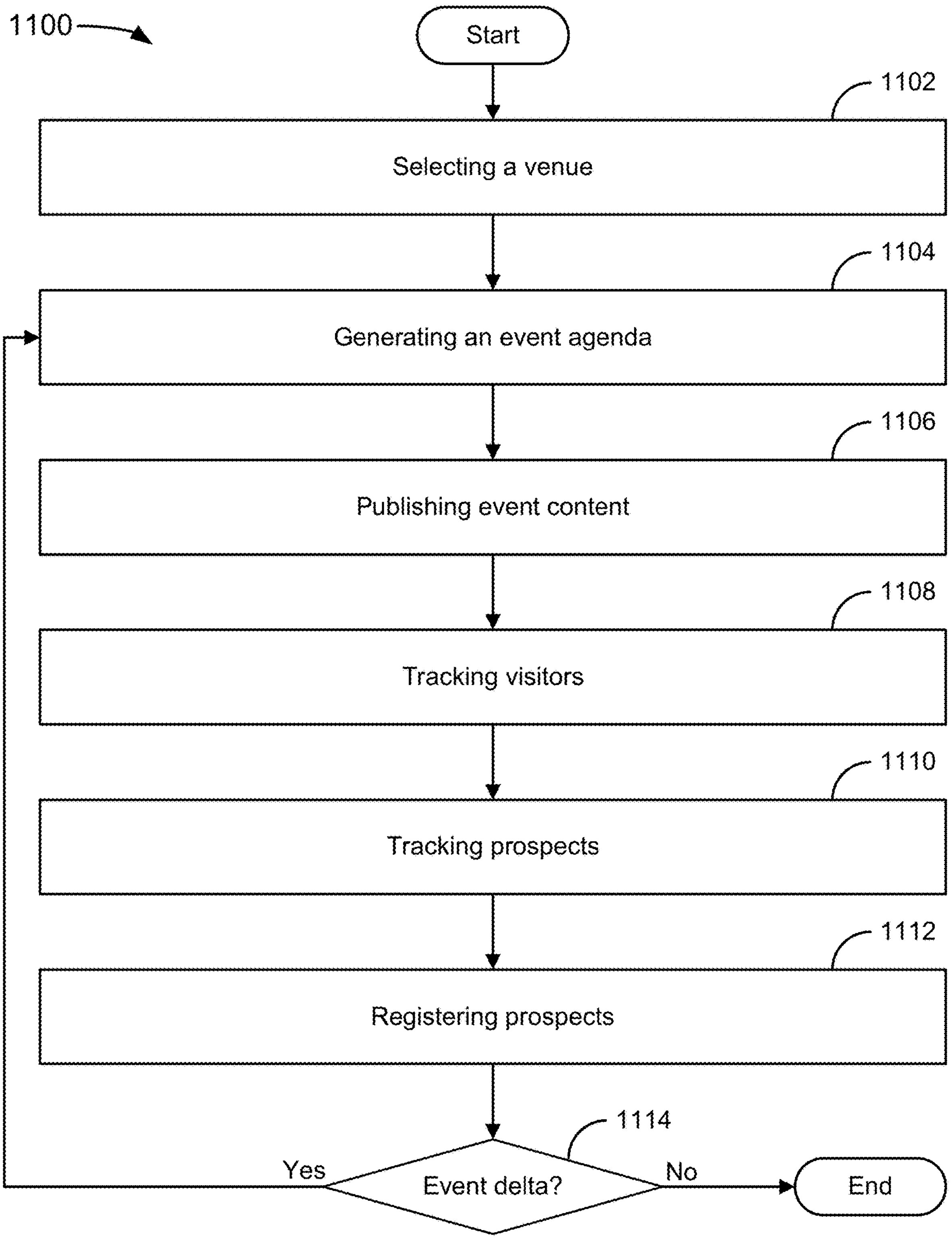
FIG. 11 depicts a flowchart of an example of a method for event organization.
Figure 12:
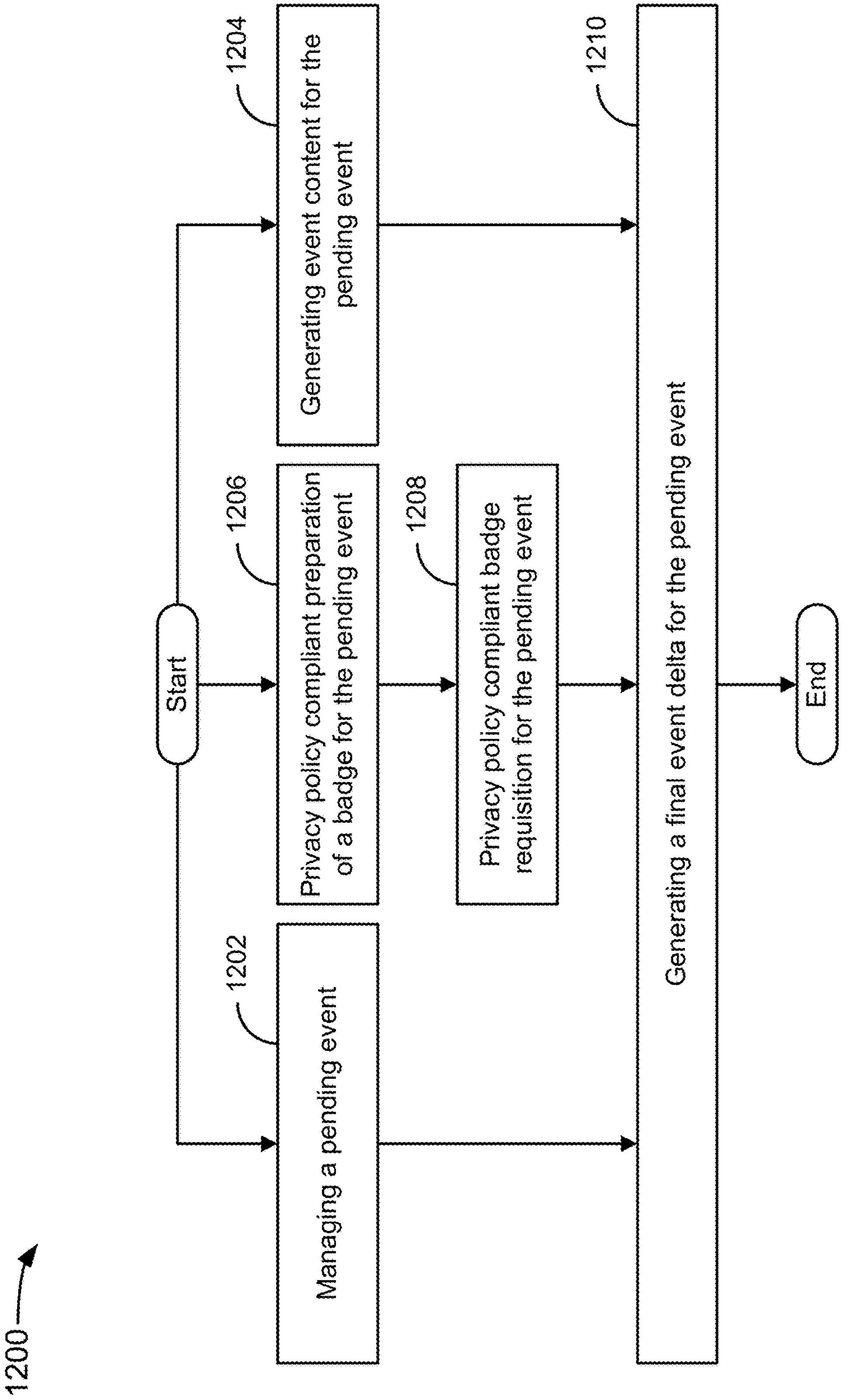
FIG. 12 depicts a flowchart of an example of a method for event planning.

FIG. 9 depicts a flowchart 900 of an example of a method for event planning and management with persona-agnostic and persona-specific badges for participants. The flowchart 900 and potentially other flowcharts described in this paper include modules that can be reordered or organized to operate in parallel. FIGS. 10-12 depict flowcharts of examples of sub-methods that are applicable to event planning and management with persona-agnostic and persona-specific badges for participants in various embodiments.

FIG. 10 depicts a flowchart 1000 of an example of a method for event administration. FIG. 11 depicts a flowchart 1100 of an example of a method for event organization. FIG. 12 depicts a flowchart 1200 of an example of a method for event planning.

The flowchart 900 starts at module 902 with creating a first event. Creating the first event can be accomplished by an event administration engine, such as the event administration engine 106 of FIG. 1. Depending upon configuration-specific, implementation-specific, or other factors, a first event data structure can be created from a template in an event template datastore or a historical events datastore, such as the historical events datastore 104 of FIG. 1. The first event data structure can be stored in a pending events datastore, such as the pending events datastore 110 of FIG. 1, with default parameter values (e.g., null, taken from the template, entered as part of event creation, or the like). An aspect, some aspects, or all aspects of event creation could also be carried out by an event organization engine, such as the event organization engine 108 of FIG. 1.

The flowchart 1000 is intended to represent a method for event creation. The flowchart 1000 starts at module 1002 with listing events from a historical events datastore. Listing events from a historical events datastore can be accomplished by an event listing engine, such as the event listing engine 202 of FIG. 2, using events from a historical events datastore, such as the historical events datastore 204 of FIG. 2, via an event admin interface engine, such as the event admin interface engine 206 of FIG. 2.

The flowchart 1000 continues to module 1004 with initializing a first event data structure. Event data structure initialization can be accomplished by an event data structure initialization engine (e.g., the event data structure initialization engine 208 of FIG. 2) storing the event data structure in a pending events datastore (e.g., the pending events datastore 210 of FIG. 2) via an event admin interface engine (e.g., the event admin interface engine 206 of FIG. 2).

The flowchart 1000 ends at module 1006 with generating an event organization alert. Generating an event organization alert can be accomplished by an event organization alert engine (e.g., the event organization alert engine 212 of FIG. 2) when an event data structure is stored or otherwise indicated to be actionable in a pending events datastore (e.g., the pending events datastore 210 of FIG. 2), which is made available to an event organizer or agent thereof via an event organizer interface engine (e.g., the event organizer interface engine 214 of FIG. 2).

Referring once again to the example of FIG. 9, the flowchart 900 continues to module 904 with organizing the first event. Organizing the first event can be accomplished by an event organization engine (e.g., the event organization engine 108 of FIG. 1) which CRUDs a pending events datastore (e.g., the pending events datastore 110 of FIG. 1) in using rules and preferences of an event organizer or agent thereof. The event organizer or agent thereof can also CRUD a persona datastore (e.g., the persona datastore 112 of FIG. 1). In a specific implementation, a responsibility or access right of an event administrator is attributed to an event organizer and/or the responsibilities or access rights of an event administrator and an event organizer are embodied in a single individual.

The flowchart 1100 is intended to represent a method for event organization. The flowchart 1100 starts at module 1102 with selecting a venue. Selecting a venue can be accomplished by a venue selection engine (e.g., the venue selection engine 304 of FIG. 3) selecting a venue from a venue details datastore (e.g., the venue details datastore 306 of FIG. 3) via an event organizer interface engine (e.g., the event organizer interface engine 302 of FIG. 3). In a specific implementation, the venue details datastore is part of either or both of a historical or pending events datastore (or is a venue provider datastore). In this implementation, the venue details datastore can include data about an unselected venue, a selected venue, and parameterized data selected or provided by the event organizer or an agent thereof via the event organizer interface engine in association with a pending event, a historical event, or a venue, and stored by the venue selection engine in the venue details datastore.

The flowchart 1100 continues to module 1104 with generating an event agenda. Generating an event agenda can be accomplished by an event agenda generation engine (e.g., the event agenda generation engine 308 of FIG. 3) via an event organizer interface engine (e.g., the event organizer interface engine 302 of FIG. 3), and stored in an event agenda datastore (e.g., the event agenda datastore 310 of FIG. 3).

The flowchart 1100 continues to module 1106 with publishing event content. Publishing event content can be accomplished by a publication engine (e.g., the publication engine 312 of FIG. 3) by taking event data from a pending events datastore (e.g., the pending events datastore 306 of FIG. 3)—and more specifically from a venue details datastore (e.g., the venue details datastore 306 of FIG. 3) or an event agenda datastore (e.g., the event agenda datastore 310 of FIG. 3)—for storage in a publication content datastore (e.g., the publication content datastore 314 of FIG. 3) for provisioning to a visitor or agent thereof through a visitor interface engine (e.g., the visitor interface engine 318 of FIG. 3).

The flowchart 1100 continues to module 1108 with tracking visitors. Tracking visitors can be accomplished by a visitor tracking engine (e.g., the visitor tracking engine 320 of FIG. 3) using data obtained from a visitor interface engine (e.g., the visitor interface engine 318 of FIG. 3) for storage in a visitor datastore (e.g., the visitor datastore 322 of FIG. 3). Website visitors will routinely be tracked using such technologies as cookies but can also be tracked using other forms of data, such as geographic location, behavioristic data, or psychographic data without tracking using PII. This data can be stored temporarily (e.g., as part of a web session) or semi-permanently in non-volatile storage and later linked to one or more personas that are determined to define the same individual. Of course, visitors can also provide data directly through the visitor interface engine 318 and an event organizer or agent thereof could provide data about a visitor, if known.

The flowchart 1100 continues to module 1110 with tracking prospects. Tracking prospects can be accomplished by a prospect tracking engine (e.g., the prospect tracking engine 324 of FIG. 3) using data obtained from a visitor interface engine (e.g., the visitor interface engine 318 of FIG. 3) for storage in a prospect datastore (e.g., the prospect datastore 326 of FIG. 3). In a specific implementation, prospects include all visitors but prospects are not necessarily visitors. Parameterized data of prospects who are not visitors can be provided by visitors through a visitor interface engine (e.g., the visitor interface engine 318 of FIG. 3) or provided by an event organizer or agent thereof through an event organizer interface engine (e.g., the event organizer interface engine 302 of FIG. 3).

The flowchart 1100 continues to module 1112 with registering prospects. Registering prospects can be accomplished by a prospect registration engine (e.g., the prospect registration engine 328 of FIG. 3) using data obtained from a visitor interface engine (e.g., the visitor interface engine 318 of FIG. 3) for storage in a registrant datastore (e.g., the registrant datastore 330 of FIG. 3). Such data can be obtained via web apps, mobile apps, or some other source through which a visitor or agent thereof provides registration data. Instead or in addition, an event manager or agent thereof can provide registration data via an event manager interface (e.g., the event manager interface 334 of FIG. 3), for storage in the registrant datastore.

The flowchart 1100 continues to decision point 1114 where it is determined whether there is an event delta. In a specific implementation, an event delta is provided by an event manager or agent thereof, via an event manager interface (e.g., the event manager interface 334 of FIG. 3), to an event delta generation engine (e.g., the event delta generation engine 336 of FIG. 3), which CRUDs an event delta data structure in an event delta datastore (e.g., the event delta datastore 338 of FIG. 3). In a specific implementation, an artificial agent of an event manager activates the event delta generation engine and an event manager approves the event delta via the event manager interface engine (or the event delta generation engine can create and approve event deltas with predetermined parameterized values using policy from a policy datastore, though policy rules can be characterized as having been provided, at least at some point, via a human or artificial agent that can be characterized as an event manager, through an interface that can be characterized as part of an event manager interface engine).

If it is determined there is an event delta (1114—Yes), then the flowchart 1100 returns to module 1104 and continues as described previously. If, on the other hand, it is determined there is not an event delta (1114—No), then the flowchart 1100 ends. As has been noted, the modules of the flowchart 1100 and other modules in this paper can be reorganized in parallel but it may be noted tracking visitors (1108), tracking prospects (1110), and registering prospects (1112) are more likely than not, at least in some embodiments, to be conducted intermittently and in parallel.

Referring once again to the example of FIG. 9, the flowchart 900 continues to module 906 with planning the first event. Planning the first event can be accomplished by an event planning engine (e.g., the event planning subsystem 116 of FIG. 1) which CRUDs a pending events datastore (e.g., the pending events datastore 110 or FIG. 1). Planning the first event can also entail CRUDing a persona datastore (e.g., the persona datastore 112 of FIG. 1). In a specific implementation, the event planning subsystem is part of a pre-event management engine (e.g., the pre-event management engine 114 of FIG. 1). Pre-event, event, and post-event management can be characterized as the task of an event manager. In a specific implementation, a responsibility or access right of an event organizer is attributed to an event manager and/or the responsibilities or access rights of an event organizer and an event manager are embodied in a single individual.

The flowchart 1200 is intended to represent an example of a method of event planning. The flowchart 1200 starts at module 1202 with managing a pending event, at module 1204 with generating event content for the pending event, and at module 1206 with privacy policy compliant preparation of a badge for the pending event. For the most part, the modules 1202, 1204, and 1206 can be treated as operating intermittently in parallel, which is why they are illustrated as flowing in parallel.

Managing a pending event (1202) is carried out by an event management engine (e.g., the event management engine 418 of FIG. 4) or a persona management engine (e.g., the persona management engine 426 of FIG. 4).

Generating event content for the pending event (1204) is carried out by an event content generation engine (e.g., the event content generation engine 410 of FIG. 4) via a content generator interface engine (e.g., the content generator interface engine 408 of FIG. 4), and stored in an event content datastore (e.g., the event content datastore 414 of FIG. 4). In a specific implementation, the event content datastore is part of a pending events datastore (e.g., the pending events datastore 412 of FIG. 4). The event content can be considered part of a pending event datastore (e.g., the pending event datastore 416 of FIG. 4), but can, even in this case, be more generally considered part of the pending events datastore. Event content can be generated by a presenter (e.g., a speaker) at an event or an agent thereof, by some other agent associated with the event or topic, or by otherwise making content available in association with a pending event (e.g., by uploading content from a device, downloading content from the Internet, or obtaining content in some other applicable manner).

Privacy policy compliant preparation of a badge for the pending event (1206) is carried out by a badge preparation engine (e.g., the badge preparation engine 436 of FIG. 4) via an event manager interface engine (e.g., the event manager interface engine 402 of FIG. 4). Privacy policy compliant preparation of a badge for the pending event may be considered an event management activity but modules 1202 and 1206 are represented as discrete modules for illustrative purposes.

The flowchart 1200 continues from module 1206 to module 1208 with privacy compliant badge requisition for the pending event. In a specific implementation, the requisition is to an external printing agency via a requisition message; requisition data is made available through an attachment to an email, through a cloud-based datastore, or via some other applicable way of providing relevant data to the external printing agency.

Following the modules 1202, 1204, and 1208, the flowchart 1200 ends at module 1210 with generating a final event delta for the pending event. Event deltas occur when changes are made to a pending event datastore and may be inherent in the activity taken to cause the delta. The final event data need not be any different than any other event delta but at some point, such as when the event begins, the last event delta will become the final one. Generating an event delta can be accomplished by an event delta generation engine (e.g., the event delta generation engine 404 of FIG. 4) via an event manager interface engine (e.g., the event manager interface engine 402 of FIG. 4), and stored in an event delta datastore (e.g., the event delta datastore 406 of FIG. 4). In a specific implementation, the event delta datastore is used by an event organizer or agent thereof to update a pending event datastore, as described with reference to FIGS. 3 and 11.

Referring once again to the example of FIG. 9, the flowchart 900 continues to module 908 with conducting a privacy policy compliant badge delivery requisition for the first event. Conducting privacy policy compliant badge delivery can be accomplished by a privacy policy compliant badge delivery engine (e.g., the privacy policy compliant badge delivery subsystem 118 of FIG. 1), which uses only such data from a pending events datastore (e.g., the pending events datastore 110 of FIG. 1) and a persona datastore (e.g., the persona datastore 112 of FIG. 1), as is permitted by privacy policy. For example, a persona-agnostic physical badge component creation engine (e.g., the persona-agnostic physical badge component creation subsystem 538 of FIG. 5) may provide a physical badge delivery system (e.g., the physical badge delivery subsystem 536 of FIG. 5) with badge-related data limited to that of a persona-agnostic event badge datastore (e.g., the persona-agnostic event badge datastore 538), or a persona-specific physical badge component creation engine (e.g., the persona-specific physical badge component creation subsystem 534 of FIG. 5) may provide the physical badge delivery system badge-related data limited to that of a persona-specific event badge datastore (e.g., the persona-specific event badge datastore 536).

In a specific implementation, the privacy policy compliant badge delivery subsystem is part of a pre-event management engine (e.g., the pre-event management engine 114 of FIG. 1). Pre-event, event, and post-event management can be characterized as the task of an event manager. In a specific implementation, a responsibility or access right of an event organizer is attributed to an event manager and/or the responsibilities or access rights of an event organizer and an event manager are embodied in a single individual.

The flowchart 900 continues to module 910 with checking in an attendee. In a specific implementation, an attendee is checked in via an event check-in engine (e.g., the event check-in subsystem 122 of FIG. 1). The event check-in engine can be considered part of an attendee reception engine (e.g., the attendee reception engine 120 of FIG. 1).

The flowchart 900 continues to module 912 with distributing a badge to the attendee. In a specific implementation, the badge is delivered to the attendee via a badge distribution system (e.g., the badge distribution subsystem 124 of FIG. 1). The badge distribution system can be considered part of an attendee reception engine (e.g., the attendee reception engine 120 of FIG. 1).

The flowchart 900 continues to module 914 with managing the first event. Managing the first event can be carried out by an event management engine (e.g., the event management engine 126 of FIG. 1).

The flowchart 900 continues to module 916 with prompting event feedback. In a specific implementation, prompting event feedback is carried out by an event feedback prompting engine (e.g., the event feedback prompting engine 128 of FIG. 1). The event feedback prompting engine can include a session participation engine (e.g., the session participation engine 130 of FIG. 1) and an event engagement engine (e.g., the event engagement engine 132 of FIG. 1). Session participation can include presentation engagement conducted by a presentation engagement engine (e.g., the presentation engagement engine 712 of FIG. 7) and session content sharing conducted by a session content sharing engine (e.g., the session content sharing engine 704 of FIG. 7). Event engagement can include off-presentation engagement conducted by an off-presentation engagement engine (e.g., the off-presentation engagement engine 804 of FIG. 8).

The flowchart 900 ends at module 918 with post-event management. In a specific implementation, post-event management is carried out by a post-event management engine (e.g., the post-event management engine 134 of FIG. 1).

Figure 13:
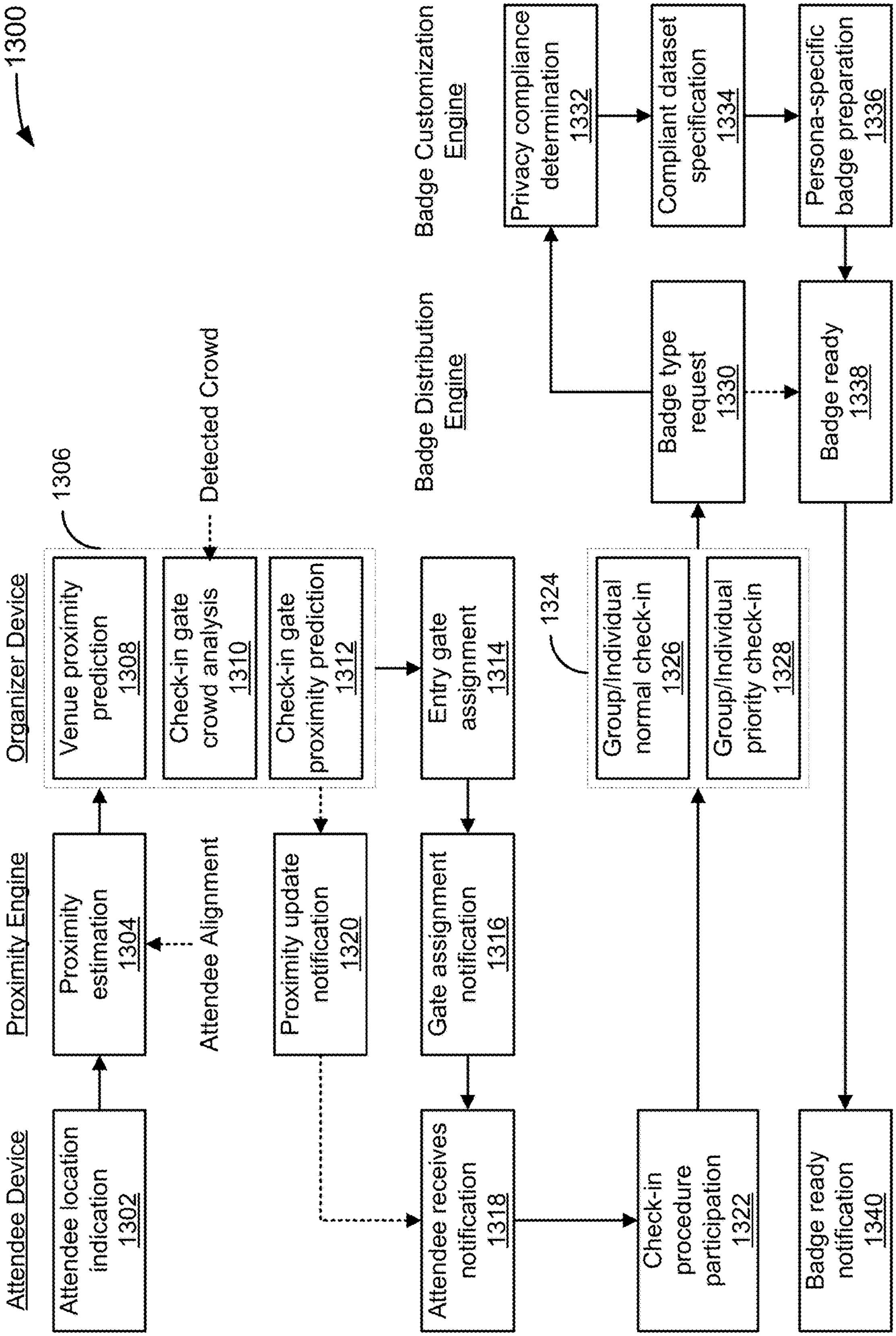
FIG. 13 depicts a flowchart of a method for check-in crowd management.

FIG. 13 depicts a flowchart 1300 of a method for check-in crowd management. The modules of flowchart 1300 are arranged vertically under a heading that is indicative of an example of an engine at which the indicated module can be implemented in whole or in part. For example, modules 1302, 1318, 1322, and 1340 fall under the "attendee device" heading; modules 1304, 1316, and 1320 fall under the "proximity engine" heading; modules 1308, 1310, 1312, 1314, 1326, and 1328 fall under the "organizer device" heading; modules 1330 and 1338 fall under the "badge distribution engine" heading; and modules 1332, 1334, and 1336 fall under the "badge customization engine" heading.

The flowchart 1300 is intended to illustrate an example of a method for automated check-in crowd management implemented at least in part on an application (app) platform. The application platform can include a device app implemented on an attendee device and an organizer app implemented on an organizer device. In a specific implementation, the device app is client software, which may be implemented as a browser to facilitate attendee engagement on a server. A version of the device app supporting functions or needs of the attendee of the event runs on the device of the attendee and comprises a registration engine, a networking/engagement engine, and a location engine. The registration engine allows an attendee to pre-register for the event via the device app. The registered information provided by the attendees of the event can be transmitted to a server that stores the information in a datastore. The datastore is a repository for persistently storing and managing collections of data which include not just repositories like databases, but also simpler store types such as simple files, emails etc. The networking/engagement engine enables chat based networking between attendees or for parking announcements by the organizers. The location engine obtains location-related information from the device (derived from location detection technologies such as GPS, Bluetooth beacons, Wi-Fi or Cellular position systems. In this example, the organizer app manages and controls a check-in process.

The flowchart 1300 starts at module 1302 with attendee location indication. In a specific implementation, an attendee's device shares location information with an application that has been installed on an end-user device, such as a smartphone. Instead or in addition, an attendee's location may not be shared, which likely makes proximity detection for a potential location more limited, and may not enable an accurate estimate of proximity until the attendee passes a more localized sensor or entry stage, such as if the attendee provides an identifier when entering a parking location.

The flowchart 1300 continues to module 1304 with proximity estimation. In a specific implementation, the proximity estimation is augmented with both the attendee location indication and attendee alignment data. Examples of attendee alignment are data from sensors that detect local proximity of the attendee's device, sensors that spot the license plate numbers of the attendee's automobile, sensors that are coupled with a facial recognition engine to identify an attendee near the venue, updates from a venue entry stage (such as a parking lot when the attendee uses a parking pass), or the like. Attendee alignment can also include messages from venue or event agents at a venue entry stage. In the example of FIG. 13, the dotted arrow indicative of attendee alignment input to module 1304 is intended to indicate attendee alignment is optional.

The flowchart 1300 continues to box 1306, which groups modules 1308, 1310, and 1312. The box 1306 is intended to indicate the modules 1308, 1310, and 1312 can work together in a manner that is difficult to group in a time-ordered sequence. Although modules 1308, 1310, and 1312 are described as occurring in a time sequence, it should be understood the flowchart can jump between the modules as applicable for a given state.

The flowchart 1300 continues to module 1308 with venue proximity prediction. In a specific implementation, an organizer application analyses proximity (usually in terms of both distance and time) from an attendee location to a venue. Advantageously, venue proximity prediction enables human and/or artificial agents of an event or venue to make informed decisions regarding improvement of throughput, decreasing wait time for priority attendees, or other aspects of guiding attendees through a check-in process.

The flowchart 1300 continues to module 1310 with check-in gate crowd analysis. In a specific implementation, check-in rate, traffic, delays, and other aspects of a check-in gate environment is used to improve a time estimate from an attendee's current location to a check-in gate. Particularly when attendee alignment improves proximity estimates, the time it takes for an attendee to move, e.g., from a parking area through a check-in gate can be determined with some confidence. In the example of FIG. 13, the dotted arrow indicative of detected crowd input to module 1310 is intended to indicate head count data extracted and captured using, for example, image or motion capture equipment. For estimating the time from parking to the check-in gate, type of crowd has to be recognized. Crowd can be classified as a moving crowd and queuing crowd. Moving crowd are spotted along the path from the parking area to the gate. They exhibit behavior of no intention to stand in the queue. Whereas the behavior of Queuing crowd is different based on four conditions: (1) they are found as a chunk (and not stationary, they move at a rate) (2) they are the closest chunk to the gate (though other chunks of people may exist for other purpose) (3) they move toward the gate (in some fashion—as straight line, s curve, and depending on nature of barricade, etc.) (4) rate of movement of people in crowd is approximately equal to the rate of checking-in happening in that gate. Thus, the distance between the parking and queuing start point estimates the time required from parking to check-in gate. When a high volume of attendees is at all gates, proximity update notifications can include a suggestion that an attendee use priority check-in.

The flowchart 1300 continues to module 1312 with check-in gate proximity prediction. In a specific implementation, at some stage of the check-in process from the time an attendee arrives at a venue, such as when the attendee is detected entering a parking location or comes within range of a wireless LAN at the venue, it becomes time to assign an entry gate based on proximity. For an attendee with high priority, it may be desirable to reduce proximity (usually as measure with time) to as low as possible, while for lower priority attendees, more emphasis may be placed upon throughput or some other component of traffic flow.

The flowchart 1300 continues to module 1314 with entry gate assignment. In a specific implementation, check-in gate crowd analysis is used when assigning an entry gate number to an attendee for check-in.

The flowchart 1300 continues to module 1316 with gate assignment notification. In a specific implementation, gate assignment notification is intended to be sent only once but updates can be sent if check-in gate crowd analysis identifies a problem, such as a problem with a printer or other delay-causing issue.

The flowchart 1300 continues to module 1318 with attendee receives notification. In a specific implementation, the notification is in the form of a push notification in the form of a small message that causes an attendee's device to communicate an assigned gate number to an attendee. The notification can be accompanied by an audible or visual alert, which may or may not be customizable by the attendee.

Returning back to the box 1306, the flowchart 1300 can also continue to module 1320 with proximity update notification and then continues to module 1318 as described above. In a specific implementation, notifications can be sent to an attendee anywhere and anytime, as appropriate, regarding proximity. Such notifications can be sent even if the location of an attendee is unknown. Advantageously, an attendee can determine proximity (distance or time) from a current location or from a check-in stage (e.g., parking location) using the proximity update notification. For example, an attendee could be informed of crowd conditions before arriving at a venue.

The flowchart 1300 continues to module 1322 with check-in procedure participation. In a specific implementation, an attendee goes to an assigned check-in gate. Advantageously, at least some aspects of check-in can be handled in an automated fashion before the attendee even says anything. For example, the attendee's device can alert an agent of the attendee's presence in line at the assigned gate. Indeed, the agent can even be informed of the attendee's imminent arrival by taking advantage of a proximity estimation, as described above with reference to module 1304.

Figure 14:
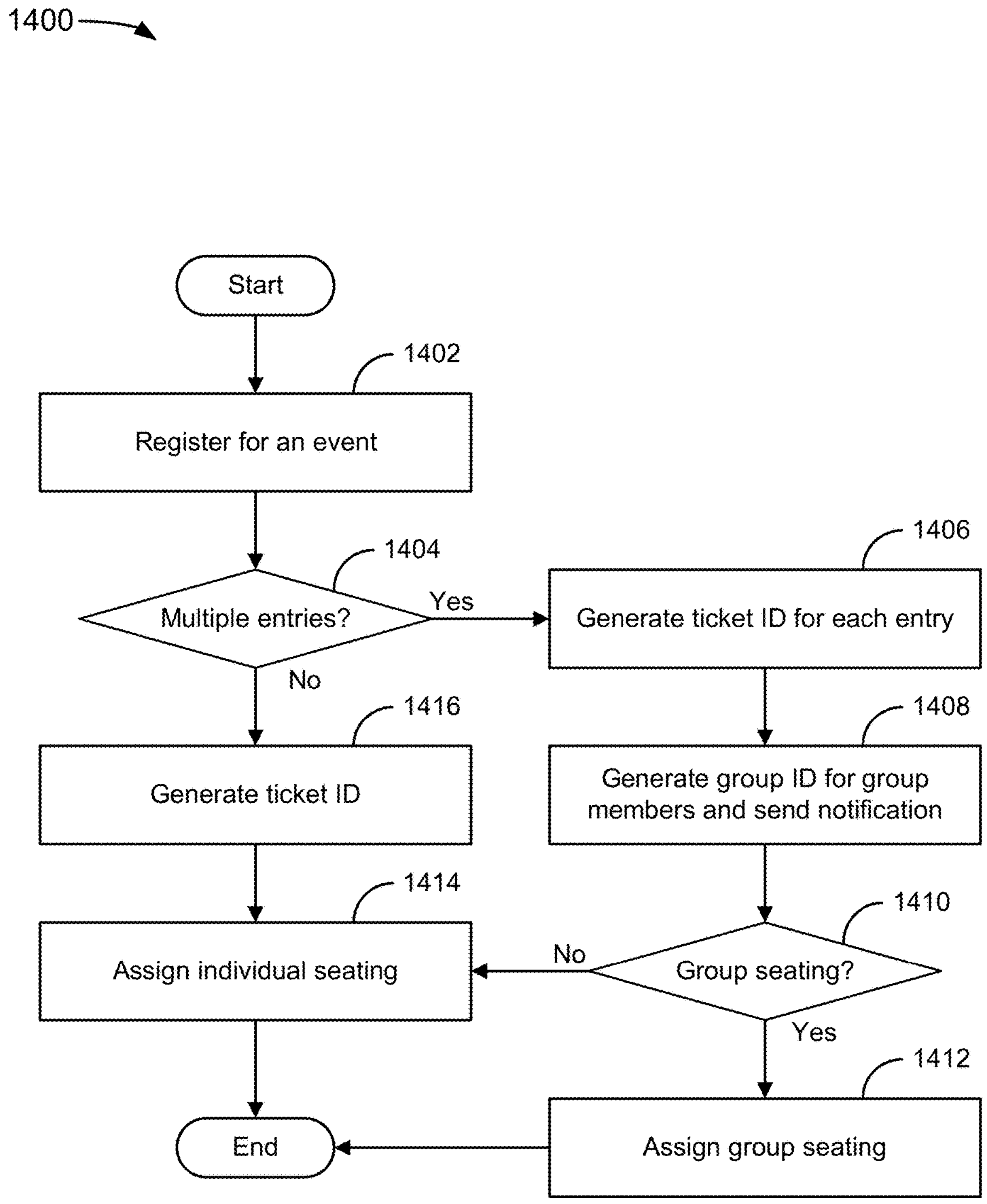
Figure 15:
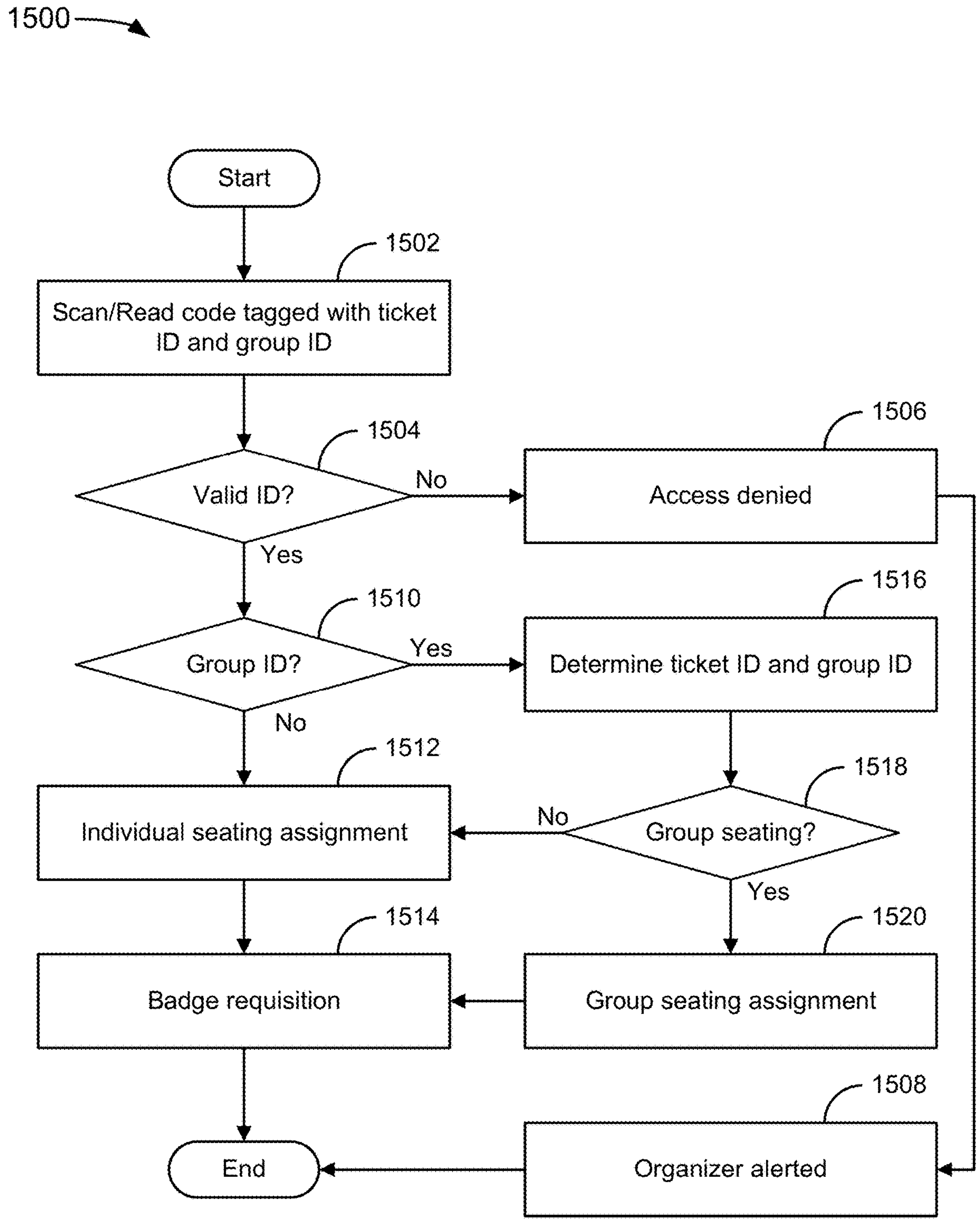

The flowchart 1300 continues to box 1324, which groups modules 1326 and 1328. The box 1326 is intended to indicate either of the modules 1326 and 1328 can be used for a given check-in. The flowchart 1300 continues to module 1326 with group/individual normal check-in and to module 1328 with group/individual priority check-in. FIG. 14 is intended to illustrate an example of a registration process that facilitates group/individual check-in and FIG. 15 is intended to illustrate an example of a check-in process that includes group and individual check-in, both of which are described later.

The flowchart 1300 continues to module 1330 with badge type request. In a specific implementation, a persona specific request is generated. A persona-specific request can be for data that is protected by privacy rules, regulations, or guidelines.

The flowchart 1300 continues to module 1332 with privacy compliance determination. In a specific implementation, badge type will determine what persona specific information should be included on a badge. Persona specific data can include a confidential profile and a non-confidential profile. Such information can include name, organization name, role, ticket class, or other information that is desired to distinguish an attendee with a badge.

The flowchart 1300 continues to module 1334 with compliant dataset specification. In a specific implementation, when the persona specific information to be included on a badge is non-confidential or both meets the privacy compliance rules and is confidential, the persona specific information is provided as a privacy compliant badge printing dataset. Even if the persona specific information does not meet privacy compliance rules, such information can be omitted or redacted as appropriate for a given implementation, configuration, or preference.

The flowchart 1300 continues to module 1336 with persona-specific badge preparation. In a specific implementation, a badge delivery system is preset according to a classification and the compliant dataset is incorporated into a physical badge (e.g., by printing on a partially printed badge appropriate for the classification). For example, a physical badge delivery subsystem can choose a printing layout or a badge type, wherein the printing layout or the badge type is based on the persona specific data response and use a load splitter technique to print badges using multiple network printers with balanced printer loads. Queuing time is the amount of time it takes for an attendee at the check-in gate and for receiving the badge. The load splitter technique enables quick and efficient badge printing using scheduling algorithms.

The flowchart 1300 continues to module 1338 with badge ready. In a specific implementation, a badge delivery human or artificial agent provides a badge ready notification to an attendee. A check-in agent may or may not also receive a badge ready notification.

The flowchart 1300 continues to module 1340 with badge ready notification. In a specific implementation, an attendee is alerted their badge is ready through an output of an attendee device. For example, the attendee may receive a message to collect a personal specific physical badge from a badge dispensing counter.

Referring back to module 1330, the system may or may not also be capable of providing a badge without persona-specific customization, as represented by the dotted arrow from module 1330 to module 1338. For example, if applicable, a guest could be provided with a blank badge on which they can write their name and/or other information.

FIG. 14 depicts a flowchart 1400 of an example of a method for generating a code tagged with a ticket ID and an optional group ID used for individual and group check-in. The technique can be combined with a system for displaying instantaneous check-in time for check-in gates, assigning an entry gate for an attendee based on check-in time, and/or for rapid and efficient badge printing.

The flowchart 1400 starts at module 1402 with registering for an event. In a specific implementation, a potential attendee or agent thereof registers for an event via a user interface or device app.

The flowchart 1400 continues to decision point 1404 where it is determined whether the registration is for multiple entries. If it is determined the registration is for multiple entries (1404—Yes), the flowchart 1400 continues to module 1406 where a ticket ID is generated for each entry (i.e., for each member of a group). Then the flowchart 1400 continues to module 1406 with generating a group ID for all relevant entries. In module 1408 once a group ID is generated a notification is sent to all members of the group with the group registration details (including for example barcode for group ID and individual ID) so that any member of the group can check-in according to the process in FIG. 15. When a group ID is first created for a registrant (e.g., a potential attendee) that registrant is designated as the owner or administrator of the group (also referred to herein as a group owner or group administrator). A group owner may designate another group member as a group owner and relinquish ownership of the group as well. In one scenario a new registrant may request to join an existing group by providing information identifying the group such as group ID, name of a member or owner of the group (note that the owner is also a member of the group). In response a confirmation request is sent to the owner of the group via the device app running on the device of the group owner. If a confirmation is received from the owner via the device app the new registrant is added to the group. A notification is sent to each group member regarding any update or change to the group via the device app running on the device of the group member.

The flowchart 1400 continues to decision point 1410 where it is determined whether group seating is desired. In a specific implementation, whether to be seated with a group can be decided at any point of the process, from registration to check-in. If it is determined group seating is desired (1410—Yes), then the flowchart 1400 ends at module 1412 with assigning seating for an attendee associated with the ticket ID with other members of the group identified by the group ID. If, on the other hand, it is determined group seating is not desired (1410—No), then the flowchart 1400 ends at module 1414 with assigning individual seating for the attendee associated with the ticket ID.

Referring back to decision point 1404, if it is determined the registration is not for multiple entries (1404—No), the flowchart 1400 continues to module 1416 with generating a ticket ID for an attendee and ends at module 1414 with assigning individual seating for the attendee. It should be understood that other mechanisms for determining seating can also be used, such as similar organizations, degrees of separation on a social media platform, priority, ticket class, or the like.

FIG. 15 depicts a flowchart 1500 of an example of a method to implement group check-in. The flowchart 1500 starts at module 1502 with scanning/reading a code tagged with a ticked ID and group ID. (It may be noted, some tickets may have a null group ID, which may or may not include any indicia, with the lack of indicia indicating the group ID is null.) In a specific implementation, at least the ticket ID is read from a QR code and matched with an entry in a datastore that includes information about attendees. The group ID or ticket ID can be implemented as a sequence of alphanumeric characters hyperlinked to a barcode or similar tag for easy access to attendee registration details by, for example, attendees or organizers, or agents thereof.

The flowchart 1500 continues to decision point 1504 where it is determined whether a ticket ID is valid. If it is determined the ticket ID is not valid (1504—No), the flowchart 1500 continues to module 1506 where access is denied and ends at module 1508 with alerting an organizer, or agent thereof, that an invalid ticket ID was scanned. The response to detecting an invalid ticket ID is implementation, configuration, and/or preference-specific, and can include allowing an attendee to register on the spot, asking the attendee to leave, or taking some other action.

If, on the other hand, it is determined the ticket ID is valid (1504—Yes), the flowchart 1500 continues to decision point 1510 where it is determined whether the code includes a group ID. If it is determined the code does not include a group ID (1510—No), then the flowchart 1500 continues to module 1512 with assigning an individual seat to an attendee and ends at module 1514 with badge requisition. Advantageously, badge requisition can be automated to being badge printing as soon as the ticket ID is identified at check-in (or even before, based upon attendee proximity).

If, on the other hand, it is determined the code includes a group ID (1510—Yes), then the flowchart 1500 continues to module 1516 with determining ticket ID and group ID and then to decision point 1518 where it is determined whether group seating is appropriate for the attendee. If it is determined group seating is not appropriate for the attendee (1518—No), then the flowchart 1500 returns to module 1512 and continues as described above. If, on the other hand, it is determined group seating is appropriate for the attendee (1518—Yes), then the flowchart continues to module 1520 with group seating assignment and ends at module 1514 with badge requisition. In a specific implementation, indicating whether group seating is appropriate for the attendee can be done at registration or at check-in (assuming the attendee has the right to make a choice regarding seating). Advantageously, when attendees registered as a group arrive at different times, they have an option to check-in individually and be seated with their group.

While seating (as in steps 1414 and 1412 in FIG. 14) assigned at registration may be on a preliminary basis, further seating assignment optimization may be carried out at the time of check-in (as in steps 1512 and 1520 of FIG. 15) based on arrival of attendees at the event location. An event can have many meeting sessions for attendees where some of the sessions may run sequentially and other sessions may run in parallel. Seating assignment optimization for attendees of an event may be needed even during these meeting sessions running sequentially or in parallel. Real-time information about attendees including location information and arrival time at the session location is used to assign seating e.g., the seating assignment for an attendee may not be triggered unless the attendee location information matches the meeting session location and attendees arriving to the session location earlier are assigned seating earlier. The seating assignment policy may fill up seating spots in the order preferred seating (e.g., from front rows to back rows in a conference room). A physical distance requirement (e.g., between any two seats) arising from health safety considerations (e.g., social distancing guidelines such as during outbreaks of pandemic infectious diseases) may be incorporated into the seating and capacity determination as room gets filled up. The seating assignment takes into account the dynamics of arrivals and departures of the attendees. Those attendees with seats not yet assigned may attend from outside the meeting session location via their personal client device or in a secondary room location or hallway via closed-circuit television or a presentation display.

Figure 16A:
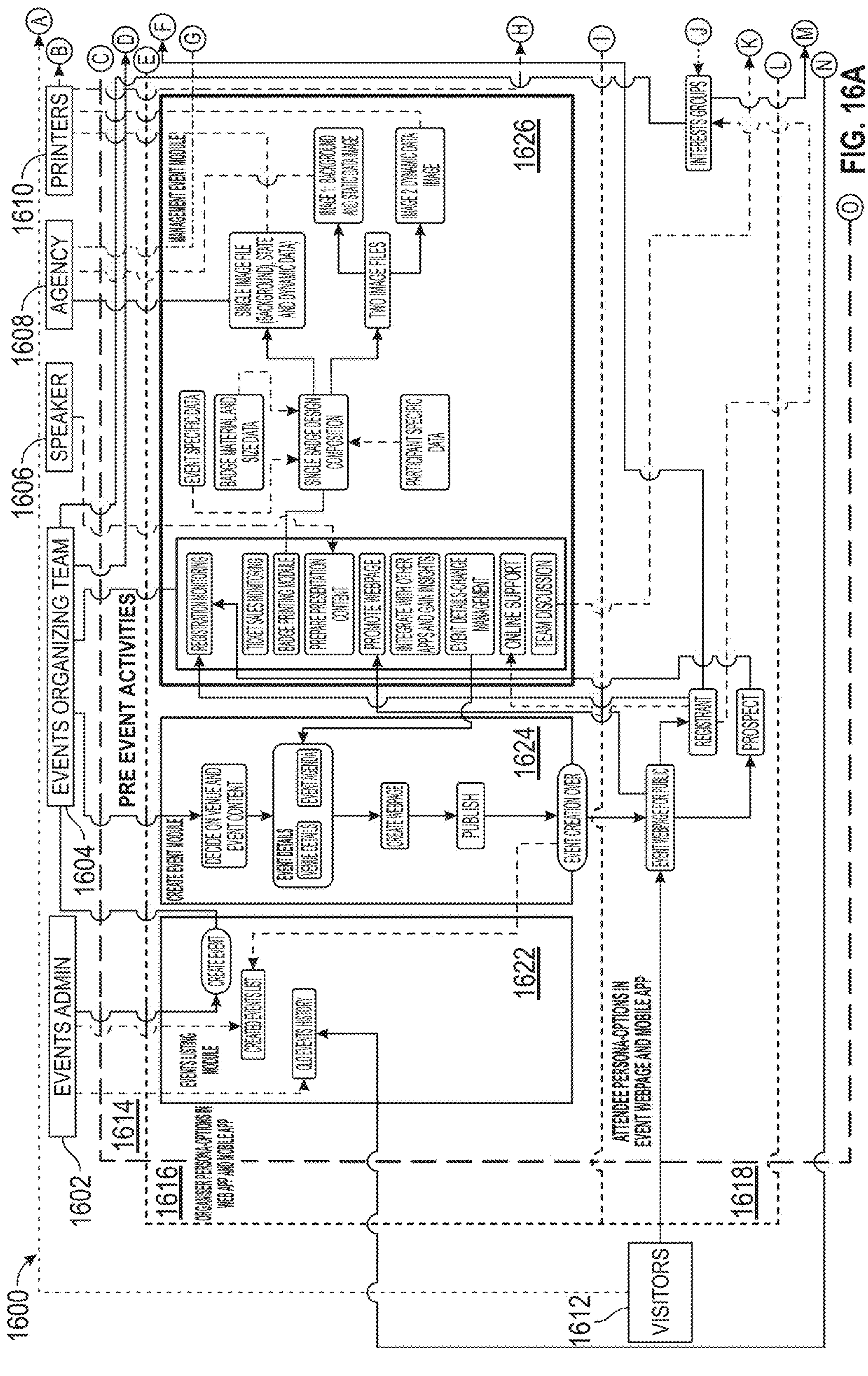
Figure 16B:
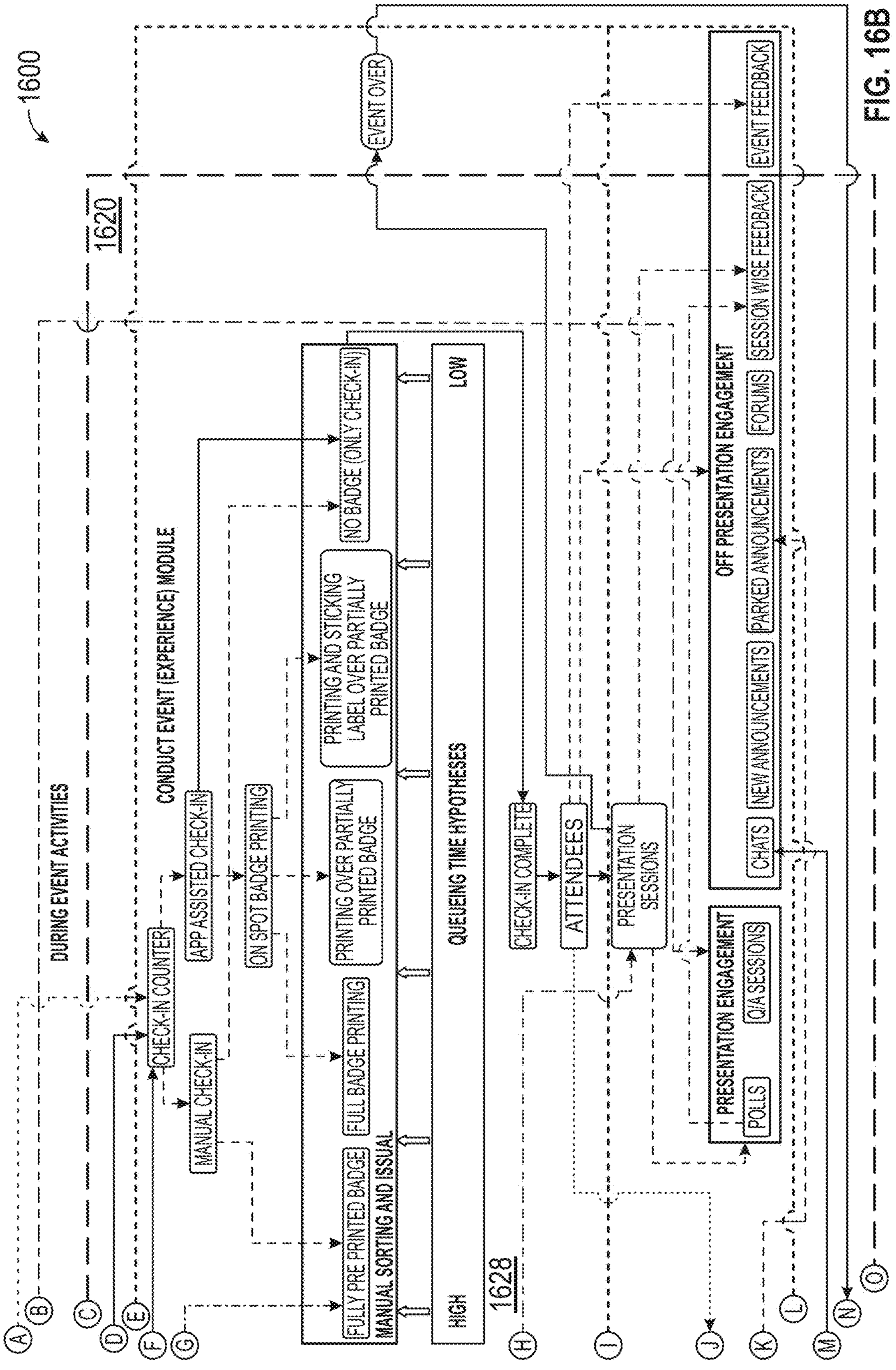

FIG. 16A and FIG. 16B depict a conceptual diagram 1600 of an example of a priority check-in actors. The conceptual diagram 1600 includes the following actors: an events admin 1602, an event organizing team 1604, speakers 1606, an external printing agency 1608, printers 1610, and visitors 1612. The conceptual diagram 1600 also includes the following activity categories: pre-event activities 1614, organizer persona activities 1616, attendee persona activities 1618, and during event activities 1620. Activities are conceptualized with algorithmic modules that include: an events listing module 1622, a create event module 1624, a manage event module 1626, and a conduct event module 1628. The various activities mentioned in association with the conceptual diagram 1600 in the following paragraphs can be derived from the techniques described in FIGS. 1-15; the example provided in FIG. 16A and FIG. 16B is simply intended to provide an over-arching conceptual depiction.

Pursuant to the example provided in FIG. 16A and FIG. 16B, the events admin 1602 performs activities that can be selected from the overlapping pre-event activities 1614 and organizer persona activities 1616 until handing control to the event organizing team 1604. The events admin 1602 would generally have access to historical data regarding events and event listings through the events listing module 1622.

Pursuant to the example provided in FIG. 16A and FIG. 16B, the event organizing team 1604 performs activities that can be selected from the overlapping pre-event activities 1614 and organizer persona activities 1616, as well as the attendee persona activities 1618. The event organizing team 1604 would work on event venue, details, content, and webpage update through the create event module 1624. The event organizing team 1604 would directly or indirectly interface with the speakers 1606, the third party printing agencies 1608, the printers 1610, and the visitors (as prospects and/or registrants who avail themselves of the attendee persona activities 1618) through the manage event module 1626. The event organizing team 1604 would continue to interact with the various parties after the event is organized with during event activities 1620 through the conduct event module 1628.

All parties can interact with one another through what can be characterized as interest group activities that can be characterized as part of all the activity categories. Similarly, presentation engagement and off-presentation engagement activities associated with the during event activities 1620 can be characterized as part of all the activity categories other than the pre-event activities 1614.

Figure 17:
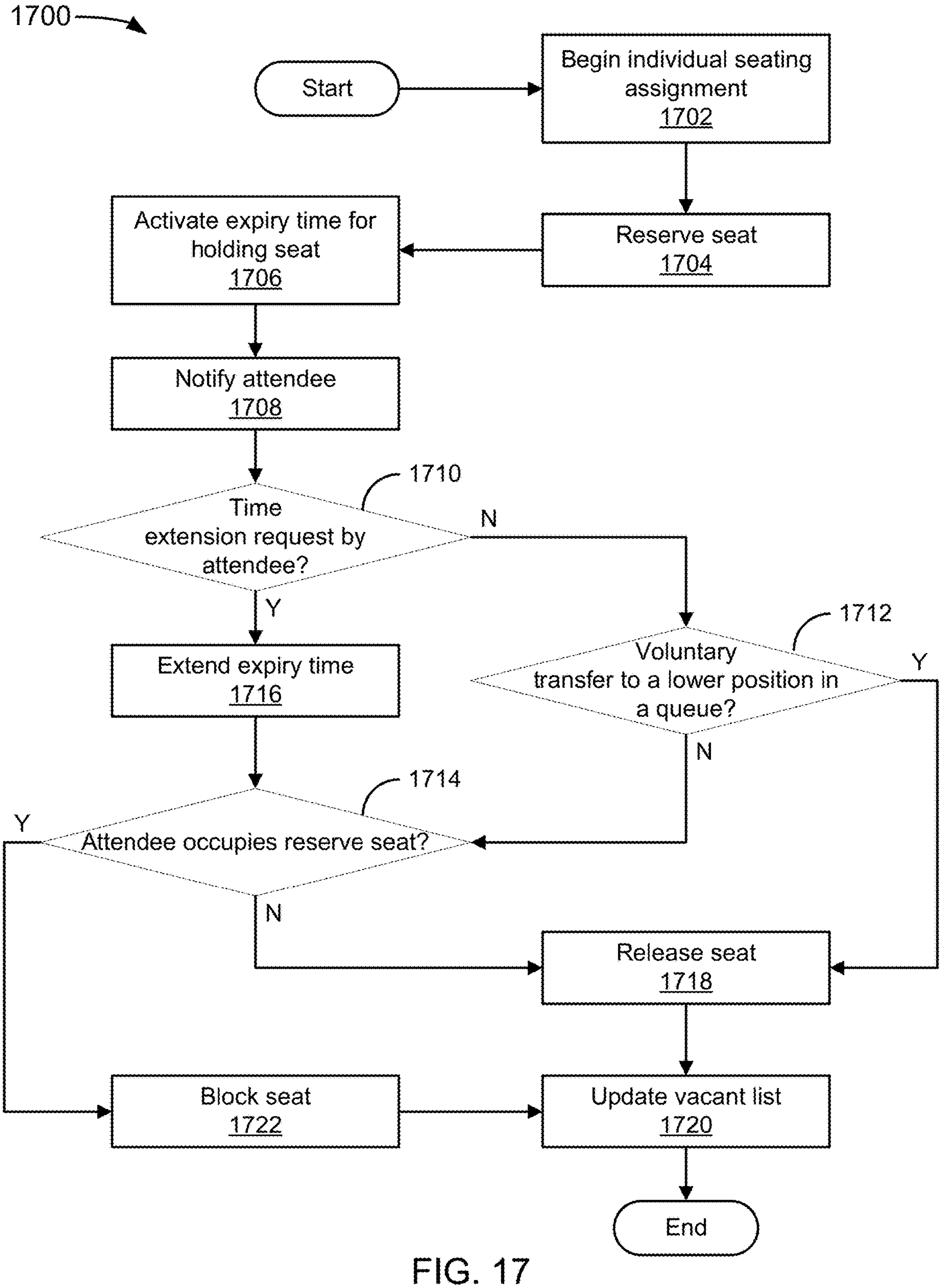
FIG. 17 depicts a flowchart for individual seating assignment.
Figure 18:
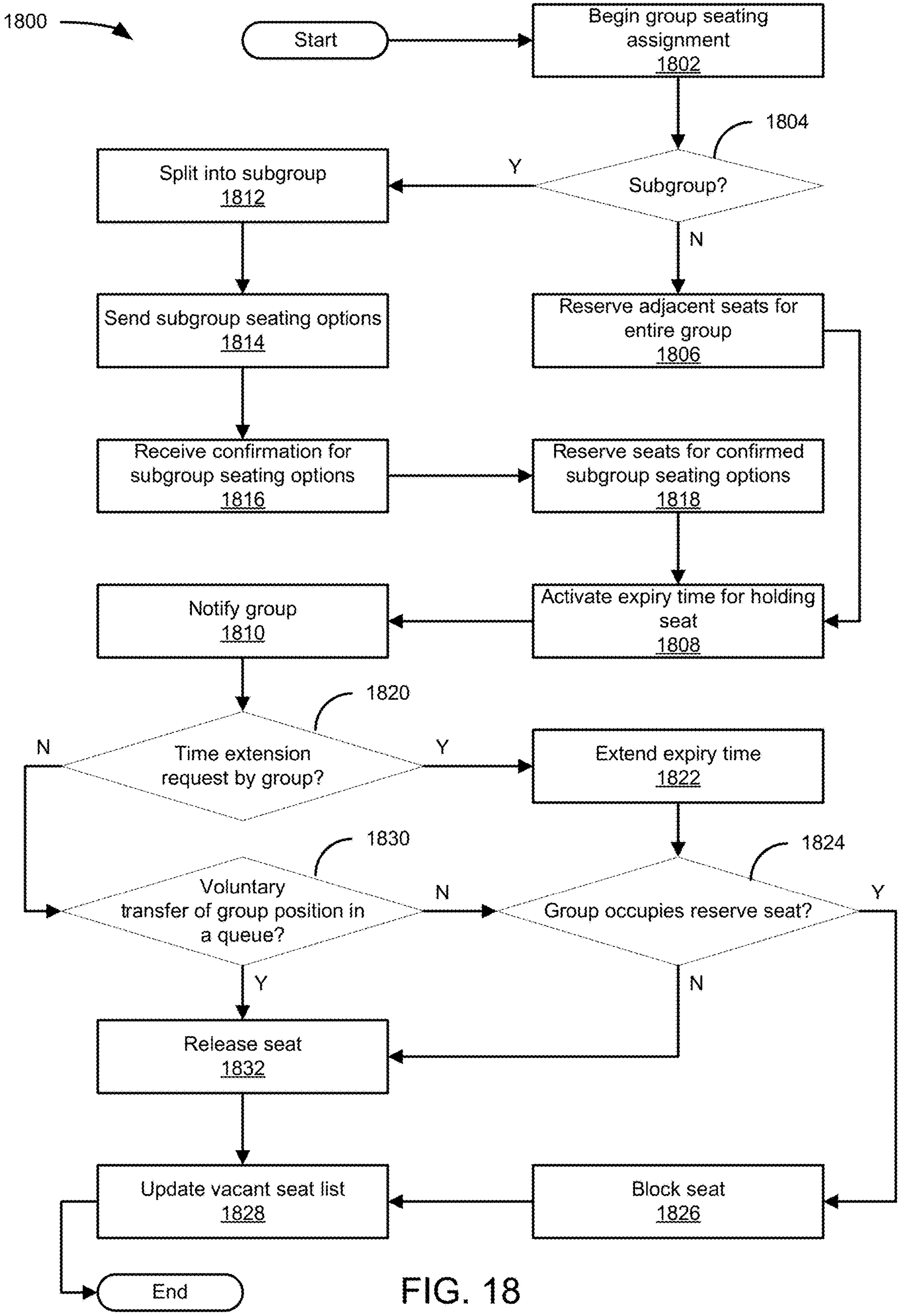
FIG. 18 depicts a flowchart for group seating assignment.
Figure 19:
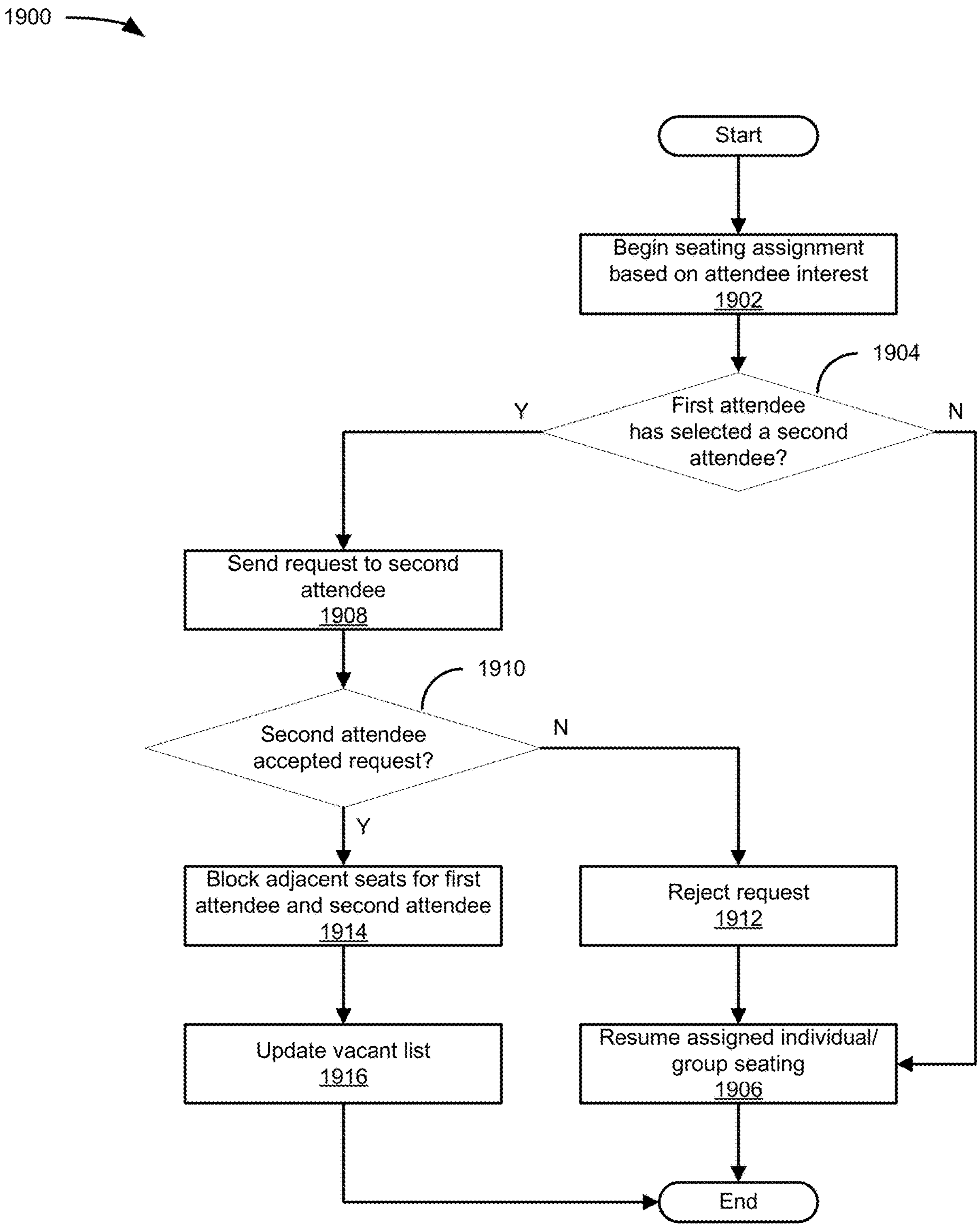
FIG. 19 depicts a flowchart for seating assignment based on attendee interest.

FIGS. 17, 18, and 19 will now be discussed in association with a specific implementation introduced in this paragraph. A seating assignment process involves the maintenance of an attendee arrival list of attendees (individuals and groups) arriving to a meeting session. A session vacancy list of vacant seats can be maintained for the meeting session. If the attendee arrival list is not empty and there are vacant seats the attendees are assigned seats in the order of arrival. If there is a group, a group seating assignment is made if possible, otherwise the group is split as needed (e.g., into smaller subgroups or even individuals) to fit the vacant seating pattern that is available. Once a seating assignment is determined for one or more attendees, a notification is sent to the corresponding attendee (or group of attendees) with an expiry time for the seating assignment (e.g., 5 minutes) after which the seating goes to the next attendee in the list. In an implementation that makes use of a device app, the notification is sent via the device app running on the device of the attendee or group member. Any one or more of the following mechanisms may be employed in verifying or determining whether an assigned seat is occupied by the attendee to whom the seat is assigned: (1) attendee device location, (2) attendee confirmation via the client app, and (3) seat occupancy sensor communicating with the server. If all attendees of a group do not occupy the seating within the expiry time, the vacant seats may or may not be assigned to other attendees (e.g., the next attendees in the attendee arrival list). A time request for extension of expiry time may or may not be allowed by an attendee (or group) via the device app; the time request may be limited to a single request and may need to be received within a predetermined time after the sending of the notification. A request via the device app by an attendee (or group) for a voluntary move to a lower priority position in the attendee arrival list may be allowed. A request via the device app by an attendee (or group) for a voluntary delay (e.g., specified as a time duration or a specific time in the future) in seating assignment may or may not be allowed, after which, if allowed, the seating assignment process will make the next available seating assignment for the attendee. If assigned seating is not taken up after a predetermined number of times (e.g., two times) an assignment notification is made and the attendee (or group) is put at the end of the attendee arrival list. If a group does not want to break into subgroups, then a group member (e.g., the group owner) can request via the device app to delay seating assignment until the seating assignment process can find the next opportunity to provide a full group seating assignment. While communication during the seating assignment process may include all members of a group, communication for negotiation of seating assignment for a group (e.g., extension of expiry time or voluntary skipping to a lower priority position in the attendee arrival list) can be conducted with the group owner, designated group member, or some other agent of the group or member. When there are departures of attendees from the meeting session, the session vacancy list can be updated to reflect a proportional increase in vacant seats.

FIG. 17 depicts a flowchart for individual seating assignment. The flowchart 1700 starts at module 1702 with beginning an individual seating assignment. In a specific implementation, individual seating assignment begins after a ticket id of an attendee is scanned.

The flowchart 1700 continues to module 1704 with reserving a seat. In a specific implementation, a seat is reserved in association with an attendee. The association can be made by allocating the seat for use in association with a ticket id provided by the attendee.

The flowchart 1700 continues to module 1706 with activating an expiry timer for holding the sea. The reserved seat is held until the timer expires. The duration of the timer is implementation-, configuration-, or preference-specific, and may or may not be the same for all attendees.

The flowchart 1700 continues to module 1708 with notifying an attendee. In a specific implementation, a notification is sent to the respective attendee including information on hall, room, or building location; reserved seat location; and expiry time, if applicable. In an implementation that includes a device app, the notification can be sent via the device app running on the device of the attendee. The attendee may be given a choice to trigger, e.g., a one time request to extend the expiry time.

The flowchart 1700 continues to decision point 1710 where it is determined whether a time extension request was received from an attendee (and approved). If it is determined that a time extension request was not received or received but not approved (1710—N), then the flowchart 1700 continues to decision point 1712 where it is determined whether a voluntary transfer to a lower position in a queue has been made by the attendee. If not (1712—N), then the flowchart 1700 continues to decision point 1714, which will be discussed below.

If, at decision point 1710, it is determined a time extension request was received from an attendee, then the flowchart 1700 continues to module 1716 with extending an expiry timer. The module 1716 assumes a request, if received, is authorized. The flowchart 1700 then continues to decision point 1714.

At decision point 1714, it is determined whether an attendee occupies a reserve seat. If it is determined an attendee has failed to occupy the reserved seat within an expiry time limit that was set at module 1706 and potentially extended at module 1716 (1714—N), then the flowchart 1700 continues to module 1718 with releasing the seat. Referring back to decision point 1712, if it is determined that a voluntary transfer to a lower position in a queue has been made by the attendee (1712—Y), then the flowchart 1700 continues directly to the module 1718, skipping decision point 1714. In a specific implementation, when the attendee opts for voluntary transfer then the reserved seat is released and the attendee is accordingly transferred to a lower priority position in the attendee arrival list. How much lower priority may or may not be dependent upon whether the transfer was voluntary or involuntary.

The flowchart 1700 then ends at module 1720 with updating a vacant list. In a specific implementation, a vacant seat can be allocated for use by another attendee. Referring back to decision point 1714, if it is determined an attendee has not failed to occupy the reserved seat within the expiry time limit that was set at module 1706 and potentially extended at module 1716 (1714—Y), then the flowchart 1700 continues to module 1722 with blocking the seat for use by the attendee and the flowchart 1700 ends at module 1720 as described previously.

FIG. 18 depicts a flowchart for group seating assignment. In an implementation of a method for assigning seats that includes group seating, a seating assignment can also be made for attendees that are not members of a group, which can be referred to as "individual attendees." The flowchart 1800 starts at module 1802 with beginning group seating assignment. For the purposes of this example, it is assumed an attendee has been identified either directly (e.g., by scanning a ticket that identifies the attendee) or indirectly (e.g., by scanning an anonymous ticket with a group id) and a determination was made that group seating is appropriate because an attendee is a member of a group.

The flowchart 1800 continues to decision point 1804 where it is determined whether the attendee is a member of a subgroup. When group seating is not available, the group is split into sub-groups. If it is determined the attendee is not a member of a subgroup and/or if splitting the group into subgroups is deemed unnecessary (1804—N), then the flowchart 1800 continues to module 1806 with reserving seats for the group. In a specific implementation, if group seating is available, seats are reserved for the entire group in accordance with seating assignment rules and based on seat availability in vacant list. The seats can be adjacent, at a specific table, or designated in some other manner in accordance with seating assignment rules, which may or may not be in accordance with attendee preferences. In an implementation that includes a device app, the group seating assignment process may or may not offer group seating via the device app based on seat availability.

The flowchart then continues to module 1808 with activating an expiry timer for holding seats. In a specific implementation, an expiry time is triggered and the reserved seats are held for a certain period of time.

The flowchart 1800 then continues to module 1810 with notifying the group. In an implementation that includes a device app, a notification is sent to device apps running on the devices of the attendees of the group and/or to a group owner or designated group representative. The notification can include information on hall location, reserved seat location and expiry time.

Referring back to decision point 1804, if it is determined the attendee is a member of a subgroup, either explicitly or because splitting into a subgroup is necessitated by circumstances (1804—Y), then the flowchart 1800 continues to module 1812 with splitting the group into subgroups of which the attendee is a member of one.

The flowchart 1800 then continues to module 1814 with sending subgroup seating options. The seats can be adjacent, at a specific table, or designated in some other manner in accordance with seating assignment rules, which may or may not be in accordance with attendee preferences. In an implementation that includes a device app, the subgroup seating assignment process may or may not offer subgroup seating via the device app based on seat availability.

The flowchart 1800 then continues to module 1816 with receiving confirmation for subgroup seating options. In a specific implementation, the attendee or a group owner or designated group or subgroup representative makes subgroup seating choices. For example, the subgroup seating assignment process may offer an option to choose a desired subgroup pattern from among offered subgroup patterns.

The flowchart 1800 then continues to module 1818 with reserving seats for confirmed subgroup seating options. In a specific implementation, upon receiving confirmation, seats can be reserved according to a chosen subgroup pattern. The flowchart 1800 then continues to module 1808 as described previously.

After module 1810, the flowchart 1800 continues to decision point 1820 where it is determined whether a time extension request has been received for the group. In a specific implementation, an attendee, group owner, or designated member of a group can be given a choice to trigger a one-time request to extend the expiry time. If it is determined an authorized extension request is received (1820—Y), then the flowchart 1800 continues to module 1822 with extending the expiry timer.

The flowchart 1800 then continues to decision point 1824 where it is determined whether the group seats are occupied. For example, when the group fails to occupy reserved seats within the expiry time, the respective seats are released and the vacant list is updated. Occupation may be defined as a single attendee occupying one of the seats, a subset of attendees occupying one of the seats, or all the members of the group occupying their seats, depending upon implementation-, configuration-, and preference-specific factors. Occupation can be verified visually, using location-detection technology, or using a trust-based system.

If it is determined that the group seats are occupied (1824—Y), then the flowchart 1800 continues to module 1826 with blocking the seats for use by the group members. The flowchart 1800 then ends at module 1828 with updating a vacant seat list to indicate the seats are not vacant. In an implementation in which the vacant seat list is binary (i.e., either a seat is vacant or it is not vacant), module 1828 can be skipped because it would be unnecessary to update the vacant seat list when the reserved seats are occupied. However, in an implementation in which the vacant seat list at least includes an indication whether a seat is vacant, reserved, or occupied, the vacant seat list would be updated when the seat status changed from reserved to occupied.

Referring back to decision point 1820, if it is determined an authorized extension request has not been received (1820—N), then the flowchart 1800 continues to decision point 1830, where it is determined whether an attendee, group owner, or group representative has voluntarily transferred group position lower in an attendee arrival list. The attendee, group owner, or group representative may be given a choice for voluntary transfer to a lower priority position in the attendee arrival list before an expiry timer has elapsed or after, depending upon implementation-, configuration-, or preference-specific factors.

If it is determined an attendee, group owner, or group representative has voluntarily transferred group position lower in an attendee arrival list (1830—Y) then the flowchart 1800 continues to module 1832 with releasing the seats and the flowchart 1800 ends at module 1828 as described previously. If, on the other hand, it is determined an attendee, group owner, or group representative has not voluntarily transferred group position lower in an attendee arrival list (1830—N) then the flowchart 1800 continues to decision point 1824 and continues as described previously.

At decision point 1824, if it is determined that the group seats are not occupied (1824—N), then the flowchart continues to module 1832 and ends at module 1828 as described previously.

FIG. 19 depicts a flowchart 1900 for seating assignment based on attendee interest. In an example scenario, a first attendee may be facilitated to select a second attendee based on desired profile information. The flowchart 1900 starts at module 1902 with beginning seating assignment based on attendee interest. In a specific implementation, a first attendee can be provided profile information. Profile information about a second attendee can include, for example, location at the event, session attended or attending at the event, designation, company, and area of interest, to name several.

The flowchart 1900 continues to decision point 1904 where it is determined whether a first attendee (e.g., the attendee currently being seated) has selected a second attendee. If it is determined the first attendee has not selected a second attendee (1904—N), then the flowchart ends at module 1906 with resuming assigned individual or group seating.

If, on the other hand, it is determined that the first attendee has selected a second attendee (1904—Y), then the flowchart 1900 continues to module 1908 with sending a request to the second attendee. In a specific implementation, the second attendee's contact information remains private when the request is relayed to the second attendee by a trusted system. In such an implementation, the first attendee selects an attendee with a desired profile (or the second attendee directly) and an acceptance request is generated and sent to the second attendee (or one or more second attendees that match the desired profile, potentially sequentially or in accordance with some other selection algorithm).

The flowchart 1900 continues to decision point 1910 where it is determined whether the second attendee accepted the acceptance request. If it is determined the second attendee did not accept the acceptance request (1912—N), then the flowchart 1900 continues to module 1912 with rejecting the request and ends at module 1906 as described previously. If the first attendee has the ability to select some other second attendee, the flowchart can instead continue to decision point 1904 (not shown).

If, on the other hand, it is determined the second attendee accepted the acceptance request (1912—Y), then the flowchart 1900 continues to module 1914 with blocking adjacent seats for the first attendee and the second attendee. In an alternative, a seating pattern can be provided in some other manner (e.g., across from a table, as part of a group, or the like). The seating pattern can be determined in a manner similar to seating patterns selected for groups, as was described, for example, with reference to FIG. 18.

The flowchart 1900 then ends at module 1916 with updating a vacant list. The vacant list update can be accomplished in a manner similar to that described, for example, with reference to FIG. 18. In a specific implementation, if the second attendee already has a seat assignment but with no adjacent vacant seat, then the second attendee may be reassigned seating in order to accommodate seating adjacent to the first attendee.

In an example of operation, during an event a group member may be at a specific location in the event (e.g., a conference hall, a presentation room or a meeting session). A notification (via the device app) may be sent to inform other group members about which session a group member has started/ended attending. Also a group member can enquire about where to find another member of the group via the device app. There may be a mix of onsite attendees and virtual attendees in a group. Virtual attendees are attendees who participate in an event by means of virtual attendance. A virtual attendee may join a meeting session by teleconferencing (via network access or internet) from their devices. A device app running on devices of attendees may include support for teleconferencing into a meeting session. A group chat facility may be created for a group with the given group ID (e.g., in response to a request from a group owner via the device app) and may include both onsite and virtual attendees of the group (e.g., by the chat engine 808). The group chat is accessed via the device app running on the device of the group member. Location information or meeting session attendance information can be tagged or appended to the name of the attendee or group member in the group chat (e.g., "@ exhibitor kiosk," "@ meeting session #3" or "@ conference hall"). The meeting session attendance information may be based on one or more of the following (1) device location during the event, (2) meeting session registration, (3) seating assignment confirmation by attendee, and (4) verification of seat occupancy as described herein. The group chat may also provide for each group member event attendance information such as which meeting sessions or exhibits the group member has attended or is attending or plans to attend (also whether onsite or virtually). The event attendance information for a group member may be updated by the corresponding group member at any time during the event. If an update is made by a group member to their event attendance information a notification may be sent to all the members of the group. Note that the event attendance information of the members of a group may be accessible even outside the group chat facility (e.g., via the device app of each group member) and may be supported and maintained independently of the group chat facility. The event attendance information may be provided and accessed either individually for each group member or for the group as a whole. Information indicating whether the group member is onsite or attending virtually may also be provided in the group chat by means of a tag, icon or symbol. The event attendance information of past events may be updated based on one or more of the following (1) device location during the event, (2) meeting session registration, (3) seating assignment confirmation by attendee, and (4) verification of seat occupancy as described herein. Thus the group chat provides a comprehensive facility for efficient and clear communication amongst group members.

In a specific implementation, an attendee can access a private chat via a device app running on the device of the attendee. The device app facilitates attendees to filter and restrict delivery of private chats based on fellow attendee profile information list such as designation, company, session to be attending/attended or other areas of interest. The attendees may configure their preference to receive a chat request from a fellow attendee using a profile information list. The attendees search for a desired profile information list in the device app and enable private chat by adding the desired profiles as favorites in a favorites list and restrict chats by adding fellow attendee profile to the block using a profile information list. The attendee thus receives filtered private chat request/messages from fellow attendees based on a desired profile in a favorites list. This eliminates receiving private chat requests/messages from profiles in the block list. In a specific implementation, profiles that are not in an attendee's favorite list cannot trigger private chat requests. The app can also facilitate unblocking a particular attendee profile or reporting an attendee. A notification is sent to the organizer when a report is triggered. For privacy purposes, the data shared during the private chat are not stored by the device app and organizers are notified only when a user is being reported.

What is claimed is:

1. A method comprising:

initiating a group seating assignment;

activating an expiry timer for holding seats;

generating and sending a notification to the group, wherein the notification includes information on hall location, reserved seat location and expiry time;

in response to determining an attendee is a member of a subgroup, splitting the group into subgroups of which the attendee is a member of one of the subgroups;

generating and sending subgroup seating options;

receiving confirmation for the subgroup seating options;

reserving seats for the confirmed subgroup seating options;

verifying, using a trust-based system, that the group seats are occupied;

blocking, based on the verification that the group seats are occupied, the seats for use by the group members;

updating, based on the verification that the group seats are occupied, a vacant seat list to indicate the seats are not vacant.

2. The method of claim 1, further comprising determining whether an authorized time extension request has been received for the group.

3. The method of claim 2, further comprising in response to determining the authorized time extension request has been received, extending the expiry timer.

4. The method of claim 1, further comprising updating a vacant seat list to indicate the seats are not vacant.

5. The method of claim 4, wherein the vacant seat list is binary.

6. The method of claim 1, further comprising in response to determining an authorized extension request has not been received, determining whether an attendee, group owner, or group representative has voluntarily transferred group position lower in an attendee arrival list.

7. The method of claim 6, wherein the attendee, group owner, or group representative is given a choice for voluntary transfer to a lower priority position in the attendee arrival list before the expiry timer has elapsed.

8. The method of claim 6, further comprising in response to determining an attendee, group owner, or group representative has voluntarily transferred group position lower in an attendee arrival list, releasing the seats.

9. The method of claim 6, further comprising in response to determining an attendee, group owner, or group representative has not voluntarily transferred group position lower in an attendee arrival list, either releasing or blocking the seats.

10. The method of claim 7, further comprising:

when a group does not want to split into subgroups, a particular member of the group requests via a device application to delay seating assignments until a next opportunity to provide a full group seating assignment is found, wherein negotiation of seating assignments for the group is conducted by the particular member of the group.

11. The method of claim 1, wherein the group is split into smaller subgroups or individuals based on an available vacant seat pattern.

12. A system comprising one or more processors and memory storing instructions that, when executed by the one or more processors, cause the system to perform:

initiating a group seating assignment;

activating an expiry timer for holding seats;

generating and sending a notification to the group, wherein the notification includes any of information on hall location, reserved seat location and expiry time;

in response to determining an attendee is a member of a subgroup, splitting the group into subgroups of which the attendee is a member of one of the subgroups;

generating and sending subgroup seating options;

receiving confirmation for subgroup seating options;

reserving seats for confirmed subgroup seating options;

verifying, using a trust-based system, that the group seats are occupied;

blocking, based on the verification that the group seats are occupied, the seats for use by the group members;

updating, based on the verification that the group seats are occupied, a vacant seat list to indicate the seats are not vacant.

* * * * *